(12) United States Patent
Haag et al.

(10) Patent No.: US 10,293,370 B2
(45) Date of Patent: May 21, 2019

(54) PROCESS FOR GRADIENT NANOVOIDED ARTICLE

(75) Inventors: Adam D. Haag, Woodbury, MN (US); William F. Edmonds, Minneapolis, MN (US); Jason S. Petaja, Cottage Grove, MN (US); Eric W. Nelson, Stillwater, MN (US); William Blake Kolb, West Lakeland, MN (US); Encai Hao, Woodbury, MN (US); Fei Lu, Woodbury, MN (US); Michael Benton Free, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1211 days.

(21) Appl. No.: 13/501,304

(22) PCT Filed: Oct. 22, 2010

(86) PCT No.: PCT/US2010/053669
§ 371 (c)(1),
(2), (4) Date: Apr. 11, 2012

(87) PCT Pub. No.: WO2011/050232
PCT Pub. Date: Apr. 28, 2011

(65) Prior Publication Data
US 2012/0201977 A1 Aug. 9, 2012

Related U.S. Application Data

(60) Provisional application No. 61/254,674, filed on Oct. 24, 2009.

(51) Int. Cl.
*B05D 3/10* (2006.01)
*B05D 5/00* (2006.01)
(Continued)

(52) U.S. Cl.
CPC .......... *B05D 3/101* (2013.01); *B05D 3/0209* (2013.01); *B05D 3/10* (2013.01); *B05D 3/107* (2013.01);
(Continued)

(58) Field of Classification Search
CPC ....... B05D 3/067; G03F 7/038; B01D 69/125; B01D 69/12; B01D 67/0088; B01D 3/14;
(Continued)

(56) References Cited

U.S. PATENT DOCUMENTS

| 2,801,185 A | 7/1957 | Iler |
| 4,379,201 A | 4/1983 | Heilmann |

(Continued)

FOREIGN PATENT DOCUMENTS

| EP | 2141138 | 1/2010 |
| JP | H11-104562 | 4/1999 |

(Continued)

OTHER PUBLICATIONS

Bicontinuous Microdomains Morphology of Block Copolymers, Hirokazu Hasegawa, Hideaki Tanaka, Komei Yamasaki, and Takeji Hashimoto, Macromolecules 1987,20, 1651-1662,1987.*

(Continued)

*Primary Examiner* — Gordon Baldwin
*Assistant Examiner* — Mohammad Mayy
(74) *Attorney, Agent, or Firm* — Gregg H. Rosenblatt

(57) ABSTRACT

A process and apparatus for producing a gradient nanovoided article, a gradient nanovoided coating, and a gradient low refractive index coating is described. The process includes providing a first solution of a polymerizable material in a solvent, and providing a first environment proximate a first region of the coating and a different second environment proximate an adjacent region of the coating. The process further includes at least partially polymerizing the (Continued)

polymerizable material to form a composition that includes an insoluble polymer matrix and a second solution. The insoluble polymer matrix includes a plurality of nanovoids that are filled with the second solution, and a major portion of the solvent from the second solution is removed. A first volume fraction of the plurality of nanovoids proximate the first region of the coating is less than a second volume fraction of the plurality of nanovoids proximate an adjacent of the coating. An apparatus for the process is also described, and includes a web line, a coating section, a partial polymerization section, and a solvent removal section.

5 Claims, 15 Drawing Sheets

(51) Int. Cl.
  *B82Y 20/00* (2011.01)
  *B05D 7/04* (2006.01)
  *B05D 3/02* (2006.01)
  *B05D 3/06* (2006.01)

(52) U.S. Cl.
  CPC ............... *B05D 5/00* (2013.01); *B05D 7/04* (2013.01); *B82Y 20/00* (2013.01); *B05D 3/0254* (2013.01); *B05D 3/067* (2013.01); *G02B 2207/101* (2013.01); *G02B 2207/107* (2013.01)

(58) Field of Classification Search
  CPC . D06N 3/14; C08J 9/28; C08J 2367/02; C08J 9/04; C08J 2383/04; B82Y 1/30; B82Y 10/00; B82Y 30/00; C08G 63/20; C08G 63/60; C08G 63/80; H01L 21/02628; H01L 21/02601; H01L 29/0665
  See application file for complete search history.

(56) References Cited

U.S. PATENT DOCUMENTS

| | | | |
|---|---|---|---|
| 4,522,958 A | 6/1985 | Das | |
| 4,737,559 A | 4/1988 | Kellen | |
| 5,100,929 A * | 3/1992 | Jochum et al. | ................. 522/64 |
| 5,694,701 A | 12/1997 | Huelsman | |
| 7,032,324 B2 | 4/2006 | Kolb | |
| 2003/0134918 A1* | 7/2003 | Ko et al. | ........................ 521/50 |
| 2004/0109950 A1* | 6/2004 | Adams | ................ C08G 77/50 427/387 |
| 2004/0162609 A1 | 8/2004 | Hossainy | |
| 2006/0019114 A1* | 1/2006 | Thies et al. | ................... 428/522 |
| 2008/0070998 A1* | 3/2008 | Takada | ...................... C08J 9/04 521/50.5 |
| 2008/0286549 A1 | 11/2008 | Pinkhassik | |
| 2009/0005468 A1 | 1/2009 | Schadler | |
| 2009/0018646 A1 | 1/2009 | Zhao | |
| 2009/0111701 A1* | 4/2009 | Ahn | .................. B01J 19/0046 506/7 |

FOREIGN PATENT DOCUMENTS

| | | |
|---|---|---|
| JP | 2003-191628 | 7/2003 |
| JP | 2004-318066 | 11/2004 |
| JP | 2006-070264 | 3/2006 |
| JP | 2006-335881 | 12/2006 |
| JP | 2007-157521 | 6/2007 |
| JP | 2009-503226 | 1/2009 |
| JP | 2009-518486 | 5/2009 |
| JP | 2009-175226 | 8/2009 |
| WO | WO 2006-035916 | 4/2006 |
| WO | WO 2008-011919 | 1/2008 |
| WO | WO 2010-120422 | 10/2010 |
| WO | WO 2010-120468 | 10/2010 |
| WO | WO 2010-120845 | 10/2010 |
| WO | WO 2010-120864 | 10/2010 |
| WO | WO 2010-120871 | 10/2010 |
| WO | WO 2010-120971 | 10/2010 |
| WO | WO 2010-121019 | 10/2010 |
| WO | WO 2011-050226 | 4/2011 |
| WO | WO 2011-050228 | 4/2011 |
| WO | WO 2011-050254 | 4/2011 |
| WO | WO 2011-050268 | 4/2011 |

OTHER PUBLICATIONS

Microfiltration and Ultrafiltration; principle and applications, L. J. Zeman, A. L. Zydney, 114-115, 1996.*
JP 2006-069207 A, English Translated, Publication date Mar. 16, 2006, Wang, W.I., and Wang Y.P.*
Japanese Office Action for JP Application No. 2012-535398, 3pgs.

* cited by examiner

PROCESS FOR GRADIENT NANOVOIDED ARTICLE

CROSS REFERENCE TO RELATED APPLICATIONS

This application is a national stage filing under 35 U.S.C. 371 of PCT/US2010/053669, filed Oct. 22, 2010, which claims priority to U.S. Application No. 61/254,674, filed Oct. 24, 2009, the disclosure of which is incorporated by reference in their entirety herein.

RELATED APPLICATIONS

This application is related to the following U.S. Patent Applications, filed on Apr. 15, 2009, and which are incorporated by reference: "Optical Construction and Display System Incorporating Same" (61/169,521); "Retroreflecting Optical Construction" (61/169,532); "Optical Film for Preventing Optical Coupling" (61/169,549); "Backlight and Display System Incorporating Same" (61/169,555); "Process and Apparatus for Coating with Reduced Defects" (61/169,427); and "Process and Apparatus for a Nanovoided Article" (61/169,429).

This application is also related to the following U.S. Patent Applications filed on an even date herewith, and which are incorporated by reference: "Gradient Low Index Article and Method" (61/254,673); "Immersed Reflective Polarizer with High Off-Axis Reflectivity" (61/254,691); "Immersed Reflective Polarizer with Angular Confinement in Selected Planes of Incidence" (61/254,692); and "Light Source and Display System Incorporating Same" (61/254,672).

BACKGROUND

Articles having a structure of nanometer sized pores or voids can be useful for applications based on optical, physical, or mechanical properties provided by their nanovoided composition. For example, a nanovoided article includes a polymeric solid network or matrix that at least partially surrounds pores or voids. The pores or voids are often filled with a gas such as air. The dimensions of the pores or voids in a nanovoided article can generally be described as having an average effective diameter which can range from about 1 nanometer to about 1000 nanometers. The International Union of Pure and Applied Chemistry (IUPAC) have provided three size categories of nanoporous materials: micropores with voids less than 2 nm, mesopores with voids between 2 nm and 50 nm, and macropores with voids greater than 50 nm. Each of the different size categories can provide unique properties to a nanovoided article.

Several techniques have been used to create porous or voided articles including, for example, polymerization-induced phase separation (PIPS), thermally-induced phase separation (TIPS), solvent-induced phased separation (SIPS), emulsion polymerization, and polymerization with foaming/blowing agents. Often, the porous or voided article produced by these methods require additional process steps, such as a washing step, to remove materials such as surfactants, oils, or chemical residues used to form the structure. The washing step can limit the size ranges and uniformity of the pores or voids produced. These techniques are also limited in the types of materials that can be used. There is a need for a rapid, reliable technique for producing nanovoided articles that does not require a washing step.

SUMMARY

In one aspect, the present disclosure provides a process for producing a gradient nanovoided coating that includes coating a first solution including a polymerizable material in a solvent onto a substrate and providing a first environment proximate a first region of the coating and a different second environment proximate an adjacent region of the coating. The process for producing a gradient nanovoided coating further includes at least partially polymerizing the polymerizable material to form an insoluble polymer matrix bicontinuous with a plurality of nanovoids and a second solution, and removing a major portion of the solvent from the second solution. A first volume fraction of the plurality of nanovoids proximate the first region of the coating is less than a second volume fraction of the plurality of nanovoids proximate an adjacent region of the coating.

In another aspect, the present disclosure provides a process for producing a gradient low refractive index coating that includes coating a photoinitiator on a surface of a substrate, coating a dispersion on the photoinitiator, irradiating the dispersion with UV radiation to at least partially polymerize the UV radiation curable material, and removing a major portion of the solvent from the dispersion after at least partially polymerizing the polymerizable material. The dispersion includes an ultraviolet (UV) radiation curable material, a solvent, and a plurality of nanoparticles. Further, irradiating the dispersion with UV radiation to at least partially polymerize the UV radiation curable material forms an insoluble polymer matrix binding the plurality of nanoparticles, and includes a plurality of nanovoids. The plurality of nanovoids are filled with the dispersion depleted of the polymerizable material and the nanoparticles. Further, a first volume fraction of the plurality of nanovoids proximate the surface of the substrate is greater than a second volume fraction of the plurality of nanovoids proximate an opposing surface of the insoluble polymer matrix.

In yet another aspect, the present disclosure provides a process for producing a gradient low refractive index coating that includes coating a dispersion on a surface of a substrate, providing at least a 100 part per million (ppm) oxygen atmosphere adjacent the dispersion, irradiating the dispersion with UV radiation to at least partially polymerize the UV radiation curable material, and removing a major portion of the solvent from the dispersion after at least partially polymerizing the polymerizable material. The dispersion includes an ultraviolet (UV) radiation curable material, a photoinitiator, a solvent, and a plurality of nanoparticles. Further, irradiating the dispersion with UV radiation to at least partially polymerize the UV radiation curable material, forms an insoluble polymer matrix binding the plurality of nanoparticles, and includes a plurality of nanovoids, the plurality of nanovoids being filled with the dispersion depleted of the polymerizable material and the nanoparticles. Still further, a first volume fraction of the plurality of nanovoids proximate the surface of the substrate is greater than a second volume fraction of the plurality of nanovoids proximate an opposing surface of the insoluble polymer matrix.

In yet another aspect, the present disclosure provides a process for producing a gradient nanovoided coating that includes coating a first solution comprising a polymerizable material in a solvent onto a substrate and at least partially polymerizing the polymerizable material to form an insoluble polymer matrix bicontinuous with a plurality of nanovoids and a second solution, the plurality of nanovoids being filled with the second solution. The process for producing a gradient nanovoided coating further includes removing a major portion of the solvent from the second solution to form a nanovoided coating having a free surface, coating a third solution on the free surface to at least partially fill the nanovoided coating, and solidifying the third solution. Further, a first volume fraction of the plurality of nanovoids proximate the free surface of the coating is less than a second volume fraction of the plurality of nanovoids proximate an opposing surface of the coating.

In yet another aspect, the present disclosure provides a process for producing a gradient nanovoided coating that includes coating a first solution comprising a polymerizable material in a solvent onto a substrate and at least partially polymerizing the polymerizable material to form a first layer including an insoluble polymer matrix bicontinuous with a plurality of nanovoids and a second solution, the plurality of nanovoids being filled with the second solution. The process for producing a gradient nanovoided coating further includes coating a third solution on the first layer to form a second layer, solidifying the third solution, and removing a major portion of the solvent from the second and the third solution to form a gradient nanovoided coating. Further, a first volume fraction of the plurality of nanovoids within the first layer is different than a second volume fraction of the plurality of nanovoids within the second layer.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
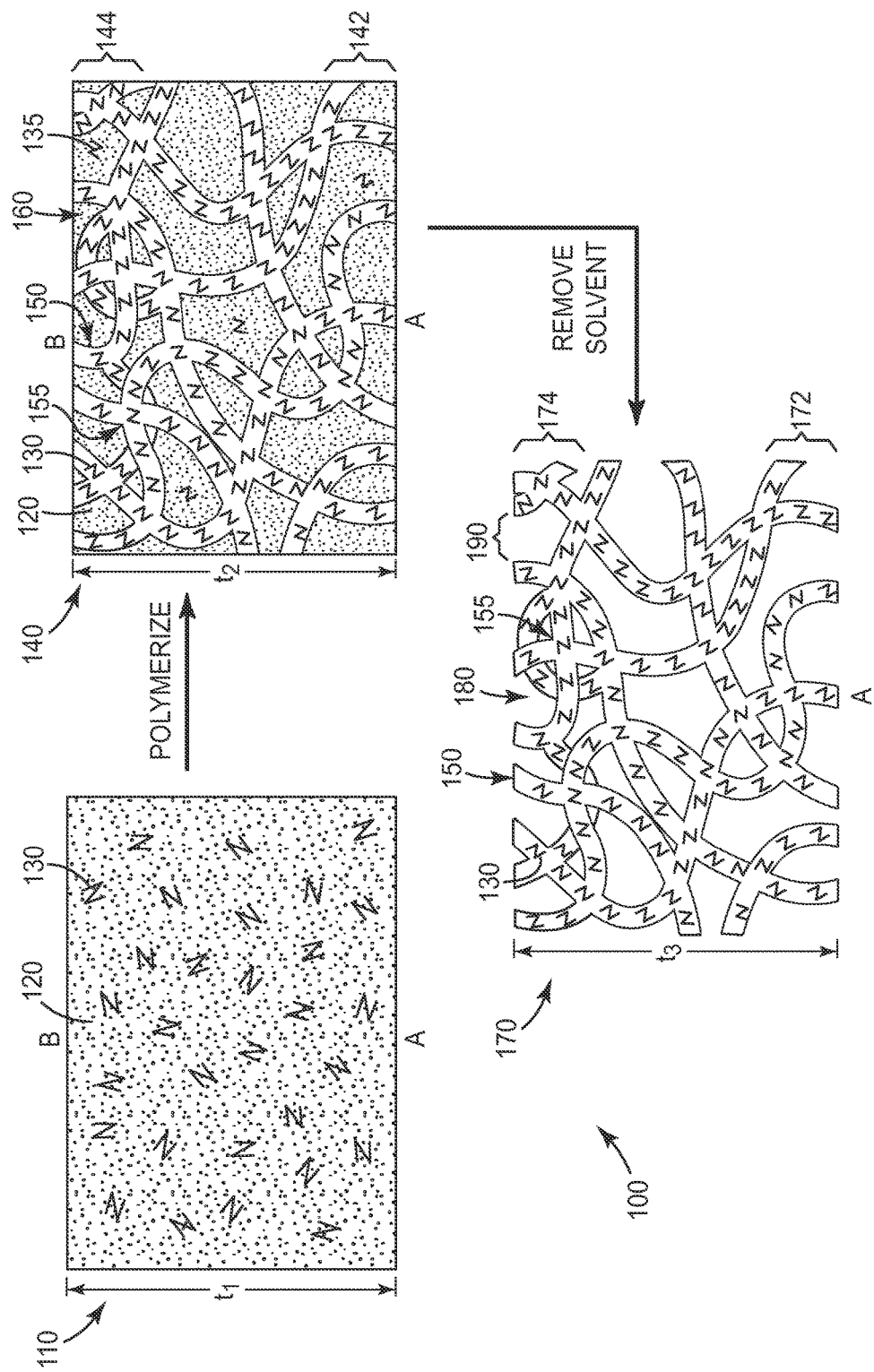
FIGS. 1A-1B are schematic views of a process for a gradient nanovoided article.

An apparatus and several unique processes for creating nanovoided articles having unique gradient morphologies is described. Generally, the process is directed to polymerization of materials in a solution, while solvent is present within the solution. The materials can be thermally polymerized, or they can be polymerized using actinic radiation. A solution including radiation-curable materials in a solvent can be particularly well suited to the production of a gradient nanovoided article. The solvent can be a mixture of solvents, and particularly well suited solvent(s) are those that are not reactive with the polymerizable materials. During polymerization, the solvent solubility of the formed polymer decreases and it separates from the solution, resulting in a composition that includes an insoluble polymer matrix and a phase separated solvent rich network.

In one particular embodiment, the volume ratio of the insoluble polymer matrix to the phase separated solvent rich network varies throughout a thickness direction of the composition. The solvent is subsequently removed, leaving pores and voids which yield the gradient nanovoided article. The solution can be coated on a substrate to provide a gradient nanovoided coating on the substrate. In some embodiments, the substrate can be subsequently removed leaving a gradient nanovoided article.

In one particular embodiment, the volume ratio of the insoluble polymer matrix to the phase separated solvent rich network can remain essentially constant throughout a thickness direction of the composition. In some cases, a second insoluble component such as, for example, a plurality of particles, can vary throughout the thickness direction, thereby varying the porosity (for example, "densifying" a portion of the composition). The solvent is subsequently removed, leaving pores and voids which yield the gradient nanovoided article. The solution can be coated on a substrate to provide a gradient nanovoided coating on the substrate. In some embodiments, the substrate can be subsequently removed leaving a gradient nanovoided article.

Generally, as used herein, "pores" and "voids" refer to the polymer-free regions within a nanovoided article that can be either partially, or totally, surrounded by the polymer matrix. "Void" is a broader term that refers to any polymer-free region, no matter how small in volume, and is only limited by the size of the nanovoided article. "Pore" is a subset of "void," and generally refers to a polymer-free region that extends substantially through the polymer matrix. A "pore" can be extensive throughout the nanovoided article, and in some embodiments connects one surface of the article to the other, as described elsewhere.

The effective diameter of any pore or void can be related to the diameter of a circle having the same cross-sectional area as the pore or void, and this effective diameter can be averaged over the dimensions of the article to provide an average effective diameter. Nanovoided articles can be "open-cell" structures, in which the pores or voids are in communication with the environment surrounding the article. Alternatively, nanovoided articles can be "closed-cell" structures in which the pores or voids are surrounded by the solid network or matrix, sealing them from the environment surrounding the article. In many cases, nanovoided articles include a combination of open-cell and closed-cell structures.

The average effective diameters of pores and voids in a nanovoided article can generally range in sizes less than about 1000 nm, less than 100 nm, or even less than about 10 nm. In some applications, particularly applications including interactions with light, the average effective diameter of the pores and voids are comparable in size to the wavelength of light used. Several exemplary nanovoided articles and uses for the nanovoided articles can be found, for example, in co-pending U.S. Publication No. 2012-003890; U.S. Pat. No. 8,891,038; U.S. Pat. No. 8,964,146; U.S. Publication No. 2012-0039089; and U.S. Pat. No. 8,534,849. The use of the nanovoided article can be dependent on the mechanical properties of the polymer matrix. In one particular embodiment, the polymer matrix modulus and strength are sufficient to maintain a void space as the solvent is removed.

In some embodiments, the polymer matrix modulus and strength are insufficient to maintain a void space after the solvent is removed, resulting in a "collapsed" coating without nanovoids. In one such embodiment, the homogeneous composition includes a polymer gel. A polymer gel is a polymer network that is expanded throughout its whole volume by a fluid (in this case the solvent), but is not self-supporting after removal of the solvent. Such a collapsed coating can provide improvements in the production of a homogeneous coating with reduced coating defects, as described for example in co-pending U.S. Publication No. 2012-0021134 .

The present process permits the ability to control the size and distribution of the pores throughout the article. In one particular embodiment, the pores and voids in the nanovoided article can be uniformly dispersed throughout the article, as described in, for example, co-pending U.S. Pat. No. 8,808,811.

In one particular embodiment as described herein, the pores and voids can be non-uniformly dispersed such as in a gradient nanovoided article, or they can vary in size, shape, and distribution throughout the gradient nanovoided article. In some cases, at least a portion of the pores and voids are continuous throughout the article, that is, there is a continuous but potentially tortuous path connecting each pore and void to the surfaces of the article. The continuous path (often resulting from a bicontinuous phase) permits ready removal of solvent from the article, rather than the solvent becoming trapped in a closed-cell structure during polymerization of the polymer matrix. In one particular embodiment, the volume fraction of voids varies throughout the article such that on one surface, substantially all of the voids are closed, and the surface becomes essentially impermeable to solvent, as described elsewhere. Gradient nanovoided articles prepared by the disclosed techniques can be used as gradient optical films, such as those described, for example, in co-pending U.S. Pat. No. 9,279,918.

In one particular embodiment, the polymerization apparatus uses recently developed ultraviolet light emitting diode (UV LED) systems. UV LED systems can be small in size and radiate very little infrared radiation or other wavelengths of light not used for free-radical polymerization. The reduction in radiation of unusable wavelengths can result in less heating of the coating. In addition, these characteristics can make it safer and more practical to expose UV-curable compositions, particularly in an environment where a coating solvent is present. UV LED systems can be configured to operate at several desired peak wavelengths, such as 365 nm, 385 nm, 395 nm, 405 nm, and the like. Other radiation sources may be used, such as, for example, UV lasers, UV lamps, visible lamps, flashlamps, and the like; other high-energy particle devices can be used, including, for example, electron-beam (EB) sources and the like.

The polymerization can occur rapidly, and the polymerization apparatus can be placed between a coating station and conventional solvent removal system. The polymerization apparatus can also be placed within conventional drying equipment or between a series of conventional drying equipment, as long as there is still a significant portion of the solvent present within the coated film at the onset of cure.

Processing parameters can affect the resulting gradient nanovoided article, including, for example, web speed, coating thickness, actinic radiation (for example, UV LED) spectrum and peak wavelength, intensity, dose, temperature, and composition of the coating at the onset of polymerization. Other processing parameters that can affect the resulting gradient nanovoided article include composition of the coating during polymerization, and environmental control, including, for example, gas phase composition, gas flow fields, and gas flow rates. Gas phase composition can include both solvent composition and concentration, and oxygen concentration particularly near the polymerization region. Control of the coated film environment from coating application through the polymerization process is desired, and can be accomplished with temperature-controlled enclosures with both supply and removal of conditioned gas. In some cases, simultaneous curing (polymerization) and drying can occur. The drying technique may also affect the thin film morphology and uniformity.

The polymer matrix should have sufficient modulus and mechanical integrity to maintain a void space after removal of the solvent. In some embodiments, the polymer matrix is a crosslinked matrix, such as a three-dimensional polymeric matrix, that resists deformation during and after solvent removal. Particulate fillers (for example, particles such as nanoparticles) can be added to the polymer matrix to affect the formation and strength of the nanovoided article. In some cases, the addition of nanoparticles can increase the effective modulus of the polymerized material, increase or decrease the pore/void average effective diameter and distribution throughout the article, decrease the conversion of the polymerizable material at the gel point, increase the viscosity of the solution before and during cure, affect the gradient densification of the matrix, or a combination of these and other effects.

In some embodiments, the process for creating the gradient nanovoided coatings generally includes 1) supplying the solution to a coating device; 2) applying the coating solution to a substrate by one of many coating techniques; 3) transporting the coated substrate to a polymerization apparatus (the environment can be controlled to deliver the thin film coating at the desired composition); 4) at least partially polymerizing while solvent is present within the coating (the polymerization can be performed in ambient conditions or in controlled environments); 5) optionally supplying conditioned gas upstream, downstream, or within the polymerization apparatus to control the polymerization environment; 6) transporting the polymerized coating to drying equipment (drying can naturally occur during this transport step unless equipment is in place to prevent it); 7) drying the polymerized coating; and 8) optionally post-processing the dried polymerized coating, for example, by additional thermal, visible, UV, or EB curing.

In one particular embodiment, a gradient nanovoided article can be prepared by control of the curing environments in different regions throughout the thickness of the article. The curing environments can be controlled by variation of curing parameters including, for example, photoinitiator concentration, polymerization inhibitor concentration, type of photoinitiator, type and concentration of compounds capable of absorbing the photoinitiating light, and the like, or a combination thereof.

In one particular embodiment, for example a coated article on a substrate, a polymerization initiator concentration can used to control the curing environment in different regions of the gradient nanovoided article. For example, the polymerization initiator concentration can be either lower or higher adjacent to the substrate, than in the bulk or on a free surface opposite the substrate. In some cases, the polymerization initiator concentration can be increased adjacent to the substrate, by coating the initiator on the surface of the substrate prior to coating the polymerizable solution on the substrate. In some cases, the rate of diffusion of such a coated polymerization initiator into the polymerization solution can be controlled by overcoating with a soluble polymer. In some cases, the polymerization initiator concentration can be increased adjacent the free surface opposite the substrate, by coating the initiator on the free surface. In some cases, multiple coatings having different concentrations of photoinitiator can be sequentially or simultaneously coated on the substrate, using, for example, slide coating, multilayer slot coating, curtain coating, and the like, as known in the multilayer coating art.

In one particular embodiment, for example a coated article on a substrate, a polymerization inhibitor concentration can be used to control the curing environment in different regions of the gradient nanovoided article. For example, the polymerization inhibitor concentration can be either lower or higher adjacent to the substrate, than in the bulk or on a free surface opposite the substrate. Polymerization inhibitors are well known, and include, for example, oxygen; a hydroquinone such as monomethyl ether hydroquinone (MEHQ); a phenothiazine; or a piperidine such as 2,2,6,6-tetramethylpiperidine-1-oxyl (TEMPO); or the like; or combinations or derivatives thereof. In some cases, oxygen is a well-known inhibitor of free-radical polymerization that can be used, and the concentration of oxygen can be higher on the free surface of the coated article. The polymerization adjacent the free surface can be inhibited such that the change in composition causes a change in the nanovoid concentration, for example, by reducing the volume fraction of nanovoids, as described elsewhere.

In one particular embodiment, for example a coated article on a substrate, an absorbance based technique can be used to change the curing environment throughout the coating. The absorbance based technique to create z-axis gradient coatings can rely on Beer's law of absorbance through the coating. Beers law states the absorbance of a sample is proportional to the molar absorbtivity, the path length, and the concentration of the material in the sample.

In some cases, for example, photoinitiating light can enter from the substrate side of the coating, which can be considered as a series of strata. The first strata intercepts the full intensity of the light, absorbs a part of this light based on the molar absorbtivity and concentration of all the species in the gel coating, passing a lower intensity of light through to the next strata, and so on. If the coating is thick enough, or the molar absorbtivities of the materials are high enough, a substantial light intensity profile can be created through the thickness of the coating, resulting in a gradient nanovoided coating.

In one particular embodiment, one of the components in the coating can be a material, or replaced with a material, that highly absorbs light. In some cases, the solvent, the nanoparticles, or the polymer can use materials that absorb the photoinitiating light. In some cases, the curing wavelength can be changed to one where the materials highly absorb. In some cases, materials can be added to the coating that absorb the photoinitiating light, but then can be removed in a secondary step, such as, for example, thermal degradation, sublimation, or solvent extraction.

In some cases, for example, the solvent for producing a nanovoided article is typically a mixture of isopropyl alcohol (IPA) and propylene glycol methyl ether (Dowanol PM), neither of which absorb at the wavelength of cure. A gradient nanovoided article can be made by replacing these typical solvents with a solvent that absorbs highly at the curing wavelength, such as, for example, trichloroethylene and nitromethane that absorb at wavelengths less than 400 nm, or ketones, which typically absorb at <330 nm. The type of photoinitiator and curing wavelength may need to be adjusted, depending on the absorbing species used.

In one particular embodiment, for example a coated article on a substrate, a particle based technique can be used to change the curing environment throughout the coating. Particle based techniques can use the particles in the coating to create gradients. In some cases, for example, an external field can be applied to a coating to cause separation due to different mobilities of the components in the field. The field could be, for example, gravitational, centrifugal, magnetic, thermal, electrical, and the like. Any field that can differentially separate components in the coating can be acceptable.

In some cases, a portion of the particles in a coating can be replaced with particles that are magnetic. An electromagnet placed over the uncured coating, can cause the particles to preferentially migrate to a surface of the coating. When cured, these migrated particles can form a denser layer at the surface than without the magnetic force. In some cases, a portion of the particles in a coating can be replaced with particles that are electrophoretic. An electric field placed around the uncured coating can cause the particles to preferentially migrate to a surface of the coating, and these migrated particles can form a denser layer at the surface than without the electric field. Other such field-induced particle migrations are known to those of skill in the art.

In one particular embodiment, for example a coated article on a substrate, a multilayer coating technique can be used to change the curing environment throughout the coating. Multilayer coating techniques can use a stack of layers having different formulations deposited sequentially or serially before the stack is cured. The multiple coatings could be applied from multiple coating dies set in close proximity, or any other methods including, for example, slide coating, multiple slot-fed knife coating, curtain coating, or a combination thereof, as known to those of skill in the art.

In some cases, a first set of layers could vary the quantity of nanoparticles in each of the formulations, and the entire stack can be cured at the same time. The top layers may form an insoluble polymer matrix, but also may subsequently collapse due to a lack of structural support. In some cases, another set of layers could vary from hydrophobic to hydrophyilic. A water based overcoat can then be applied in a subsequent step, and will only penetrate through the hydrophyllic layers, leaving the hydrophobic layers below free of the overcoat. In some other cases, a set of layers could vary the amount of photoinitiator or inhibitor in the coating, and therefore vary the cure and polymer matrix formation, where the bottom layers have different amounts than the top layers, as described elsewhere. In some cases, a set of layers can include compositions that are cured by different curing mechanisms, for example, a thermally cured layer and a radiation cured layer that can be cured either sequentially or simultaneously.

In one particular embodiment, for example a coated article on a substrate, a controlled filling technique can be used to create a densified region or otherwise modify the coating to form a gradient, particularly after cure. A controlled filling technique can use a layer of material coated onto the cured nanovoided article (for example, an overcoat), effectively sealing the top surface. In some cases, a controlled filling technique can be used instead to promote the formation of a greater void volume fraction of interconnected voids at a surface, for example, by coating additional solvent on a solvent lean coating, as described elsewhere. The infiltration of the layer into the cured nanovoided article could be controlled by controlling the volume or mobility of the applied overcoat layer. The coating method can include, for example, die coating, gravure coating, knife coating, spray coating, and the like.

In some cases, the infiltration of the coating into the cured nanovoided article can be controlled by coating the overcoat layer after cure of the nanovoided article, but before the solvent has been removed from the coating, as described elsewhere. In some cases, the chemistry of the coatings can be used to exclude the overcoat from the cured nanovoided coating, for example, by only slightly wetting the gel coating so the overcoat would not wick into the surface. In some cases, emulsion or colloidal containing layers can be used in a manner similar to varying the particle size or concentration, to reduce the volume fraction of interconnected voids in one region of the nanovoided article. In some cases, yet another technique can be to treat the cured nanovoided article with a plasma or flame treatment to activate the surface, limiting penetration of the overcoat to where the surface was activated.

FIG. 1A shows a schematic view of a process 100 for forming a gradient nanovoided article 170 according to one aspect of the disclosure. A first solution 110 that includes a polymerizable material 130 in a solvent 120 is provided. A first curing environment "A" and a second curing environment "B" is provided adjacent to opposing portions of the first solution 110. Each of the first and second curing environments A, B, can represent any of the techniques described above for changing the curing environment in different regions of the coating, such as, for example, the photoinitiator concentration adjacent curing environment A can be different that the photoinitiator concentration adjacent curing environment B, and so on. The first and second curing environments A, B, can be separated by a first through third thickness (t1, t2, t3) of the first solution 110, a composition 140, and a gradient nanovoided article 170, respectively. In one embodiment, each of the first through third thickness (t1, t2, t3) are different.

The polymerizable material 130 of the first solution 110 is at least partially polymerized to form a composition 140 that includes an insoluble polymer matrix 150 in a second solution 160. A first region 142 adjacent first curing environment A can have a different volume fraction of the insoluble polymer matrix 150 than a second region 144 adjacent second curing environment B, as described elsewhere. FIG. 1 shows, for example, the first region 142 having a lower volume fraction of insoluble polymer matrix 150 than the second region 144.

A major portion of the solvent 120 is removed from the second solution 160 to form the gradient nanovoided article 170. A first region 172 adjacent first curing environment A can have a different volume fraction of the insoluble polymer matrix 150 (and a different volume fraction of nanovoids) than a second region 174 adjacent second curing environment B, as described elsewhere. FIG. 1A shows, for example, the first region 172 having a lower volume fraction of insoluble polymer matrix 150 (and a higher volume fraction of nanovoids) than the second region 174.

The second solution 160 is depleted of the polymerizable material 130; however, some polymerizable material 130 can remain in the second solution 160, as described elsewhere. Gradient nanovoided article 170 includes the insoluble polymer matrix 150 and a plurality of voids 180 having an average effective diameter 190. Both the average effective diameter 190, and the volume fraction of the voids 180 can vary throughout gradient nanovoided article 170. Although not shown in FIG. 1A, it is to be understood that the first solution 110 can be coated on a substrate (not shown), to form a gradient nanovoided coating on the substrate. In some cases, gradient nanovoided article 170 can be an intermediate gradient nanovoided article 170 that can further undergo a final curing step, as described elsewhere.

Polymerizable material 130 can be any polymerizable material that can be polymerized by various conventional cationic or free radical polymerization techniques, which can be chemical, thermal, or radiation initiated, including, for example, solvent polymerization, emulsion polymerization, suspension polymerization, bulk polymerization, and radiation polymerization, including, for example, processes using actinic radiation including, for example, visible and ultraviolet light, electron beam radiation and combinations thereof.

Actinic radiation curable materials include monomers, oligomers, and polymers of acrylates, methacrylates, urethanes, epoxies and the like. Representative examples of energy curable groups suitable in the practice of the present disclosure include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. Free radically polymerizable groups are preferred. In some embodiments, exemplary materials include acrylate and methacrylate monomers, and in particular, multifunctional monomers that can form a cross-linked network upon polymerization can be used, as known in the art. The polymerizable materials can include any mixture of monomers, oligomers and polymers; however the materials must be at least partially soluble in at least one solvent. In some embodiments, the materials should be soluble in the solvent monomer mixture.

As used herein, the term "monomer" means a relatively low molecular weight material (that is, having a molecular weight less than about 500 g/mole) having one or more energy polymerizable groups. "Oligomer" means a relatively intermediate molecular weight material having a molecular weight of from about 500 up to about 10,000 g/mole. "Polymer" means a relatively high molecular weight material having a molecular weight of at least about 10,000 g/mole, preferably at 10,000 to 100,000 g/mole. The term "molecular weight" as used throughout this specification means number average molecular weight unless expressly noted otherwise.

Exemplary monomeric polymerizable materials include styrene, alpha-methylstyrene, substituted styrene, vinyl esters, vinyl ethers, N-vinyl-2-pyrrolidone, (meth)acrylamide, N-substituted (meth)acrylamide, octyl (meth)acrylate, iso-octyl (meth)acrylate, nonylphenol ethoxylate (meth)acrylate, isononyl (meth)acrylate, diethylene glycol (meth)acrylate, isobornyl (meth)acrylate, 2-(2-ethoxyethoxy)ethyl (meth)acrylate, 2-ethylhexyl (meth)acrylate, lauryl (meth)acrylate, butanediol mono(meth)acrylate, beta-carboxyethyl (meth)acrylate, isobutyl (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxy functional polycaprolactone ester (meth)acrylate, hydroxyethyl (meth)acrylate, hydroxymethyl (meth) acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like.

Oligomers and polymers may also be collectively referred to herein as "higher molecular weight constituents or species." Suitable higher molecular weight constituents may be incorporated into compositions of the present disclosure. Such higher molecular weight constituents may provide benefits including viscosity control, reduced shrinkage upon curing, durability, flexibility, adhesion to porous and non-porous substrates, outdoor weatherability, and/or the like. The amount of oligomers and/or polymers incorporated into fluid compositions of the present disclosure may vary within a wide range depending upon such factors as the intended use of the resultant composition, the nature of the reactive diluent, the nature and weight average molecular weight of the oligomers and/or polymers, and the like. The oligomers and/or polymers themselves may be straight-chained, branched, and/or cyclic. Branched oligomers and/or polymers tend to have lower viscosity than straight-chain counterparts of comparable molecular weight.

Exemplary polymerizable oligomers or polymers include aliphatic polyurethanes, acrylics, polyesters, polyimides, polyamides, epoxy polymers, polystyrene (including copolymers of styrene) and substituted styrenes, silicone containing polymers, fluorinated polymers, combinations of these, and the like. For some applications, polyurethane and acrylic-containing oligomers and/or polymers can have improved durability and weatherability characteristics. Such materials also tend to be readily soluble in reactive diluents formed from radiation curable, (meth)acrylate functional monomers.

Because aromatic constituents of oligomers and/or polymers generally tend to have poor weatherability and/or poor resistance to sunlight, aromatic constituents can be limited to less than 5 weight percent, preferably less than 1 weight percent, and can be substantially excluded from the oligomers and/or polymers and the reactive diluents of the present disclosure. Accordingly, straight-chained, branched and/or cyclic aliphatic and/or heterocyclic ingredients are preferred for forming oligomers and/or polymers to be used in outdoor applications.

Suitable radiation curable oligomers and/or polymers for use in the present disclosure include, but are not limited to, (meth)acrylated urethanes (that is, urethane (meth)acrylates), (meth)acrylated epoxies (that is, epoxy (meth)acrylates), (meth)acrylated polyesters (that is, polyester (meth) acrylates), (meth)acrylated (meth)acrylics, (meth)acrylated silicones, (meth)acrylated polyethers (that is, polyether (meth)acrylates), vinyl (meth)acrylates, and (meth)acrylated oils.

Solvent 120 can be any solvent that forms a solution with the desired polymerizable material 130. The solvent can be a polar or a non-polar solvent, a high boiling point solvent or a low boiling point solvent, and a mixture of several solvents may be preferred. The solvent or solvent mixture may be selected so that the insoluble polymer matrix 150 formed is at least partially insoluble in the solvent (or at least one of the solvents in a solvent mixture). In some embodiments, the solvent mixture can be a mixture of a solvent and a non-solvent for the polymerizable material. During polymerization, the first solution 110 separates to form the second solution 160 and a polymer-rich solution that polymerizes to form the insoluble polymer matrix 150. In one particular embodiment, the insoluble polymer matrix 150 can be a three-dimensional polymer matrix having polymer chain linkages 155 that provide the three-dimensional framework. The polymer chain linkages 155 can prevent deformation of the insoluble polymer matrix 150 after removal of the solvent 120. In one particular embodiment, the solvent 120 can include a solvent that absorbs radiation used to polymerize the coating, as described elsewhere.

In some embodiments, the second solution 160 can include some remaining polymerizable material 135 that is not incorporated in the insoluble polymer matrix 150, as shown in FIG. 1A (that is, the second solution 160 has become depleted of polymerizable material 135, but some may still be present). In one particular embodiment, it is preferred to minimize the amount of remaining polymerizable material 135 in the second solution 160, by maximizing the extent of polymerization of composition 140. In one particular embodiment, it may be desirable to retain a larger proportion of polymerizable material 135 adjacent one of the curing environments A or B, to reduce the porosity of the gradient nanovoided article 170 in first or second region 142, 144, as described elsewhere.

In one embodiment, solvent 120 can be easily removed from the composition 140 by drying, for example, at temperatures not exceeding the decomposition temperature of either the insoluble polymer matrix 150, or the substrate (if included). In one particular embodiment, the temperature during drying is kept below a temperature at which the substrate is prone to deformation, for example, a warping temperature or a glass-transition temperature of the substrate. Exemplary solvents include linear, branched, and cyclic hydrocarbons, alcohols, ketones, and ethers, including for example, propylene glycol ethers such as DOWANOL™ PM propylene glycol methyl ether, isopropyl alcohol, ethanol, toluene, ethyl acetate, 2-butanone, butyl acetate, methyl isobutyl ketone, water, methyl ethyl ketone, cyclohexanone, acetone, aromatic hydrocarbons, isophorone, butyrolactone, N-methylpyrrolidone, tetrahydrofuran, esters such as lactates, acetates, propylene glycol monomethyl ether acetate (PM acetate), diethylene glycol ethyl ether acetate (DE acetate), ethylene glycol butyl ether acetate (EB acetate), dipropylene glycol monomethyl acetate (DPM acetate), iso-alkyl esters, isohexyl acetate, isoheptyl acetate, isooctyl acetate, isononyl acetate, isodecyl acetate, isododecyl acetate, isotridecyl acetate or other iso-alkyl esters; combinations of these and the like.

The first solution 110 can also include other ingredients including, for example, initiators, curing agents, cure accelerators, catalysts, crosslinking agents, tackifiers, plasticizers, dyes, surfactants, flame retardants, coupling agents, pigments, impact modifiers including thermoplastic or thermoset polymers, flow control agents, foaming agents, fillers, glass and polymer microspheres and microparticles, other particles including electrically conductive particles, thermally conductive particles, magnetic particles, fibers, antistatic agents, antioxidants, UV absorbers, and the like.

An initiator, such as a photoinitiator, can be used in an amount effective to facilitate polymerization of the monomers present in the first solution 110. The amount of photoinitiator can vary depending upon, for example, the type of initiator, the molecular weight of the initiator, the intended application of the resulting insoluble polymer matrix 150 and the polymerization process including, for example, the temperature of the process and the wavelength of the actinic radiation used. Useful photoinitiators include, for example, those available from Ciba Specialty Chemicals under the IRGACURE™ and DAROCURE™ trade designations, including IRGACURE™ 184 and IRGACURE™ 819.

In some embodiments, a mixture of initiators and initiator types can be used, for example to control the polymerization in different sections of the process. In one embodiment, optional post-processing polymerization may be a thermally initiated polymerization that requires a thermally generated free-radical initiator. In other embodiments, optional post-processing polymerization may be an actinic radiation initiated polymerization that requires a photoinitiator. The post-processing photoinitiator may be the same or different than the photoinitiator used to polymerize the polymer matrix in solution.

The insoluble polymer matrix 150 may be cross-linked to provide a more rigid polymer network. Cross-linking can be achieved with or without a cross-linking agent by using high energy radiation such as gamma or electron beam radiation. In some embodiments, a cross-linking agent or a combination of cross-linking agents can be added to the mixture of polymerizable monomers. The cross-linking can occur during polymerization of the polymer network using any of the actinic radiation sources described elsewhere.

Useful radiation curing cross-linking agents include multifunctional acrylates and methacrylates, such as those disclosed in U.S. Pat. No. 4,379,201 (Heilmann et al.), which include 1,6-hexanediol di(meth)acrylate, trimethylolpropane tri(meth)acrylate, 1,2-ethylene glycol di(meth)acrylate, pentaerythritol tri/tetra(meth)acrylate, triethylene glycol di(meth)acrylate, ethoxylated trimethylolpropane tri(meth)acrylate, glycerol tri(meth)acrylate, neopentyl glycol di(meth)acrylate, tetraethylene glycol di(meth)acrylate, 1,12-dodecanol di (meth)acrylate, copolymerizable aromatic ketone co-monomers such as those disclosed in U.S. Pat. No. 4,737,559 (Kellen et al.) and the like, and combinations thereof.

The first solution 110 may also include a chain transfer agent. The chain transfer agent is preferably soluble in the monomer mixture prior to polymerization. Examples of suitable chain transfer agents include triethyl silane and mercaptans. In some embodiments, chain transfer can also occur to the solvent; however this may not be a preferred mechanism.

In one particular embodiment, the polymerizing step preferably includes using a radiation source in an atmosphere that has a low oxygen concentration. Oxygen is known to quench free-radical polymerization, resulting in diminished extent of cure. In one particular embodiment, the polymerizing step includes a radiation source in an atmosphere that has an elevated oxygen concentration, for example, greater than about 100 part per million (ppm), greater than about 500 ppm, greater than about 1000 ppm, greater than about 2000 ppm, greater than about 3000 ppm, or more.

The radiation source used for achieving polymerization and/or crosslinking may be actinic (for example, radiation having a wavelength in the ultraviolet or visible region of the spectrum), accelerated particles (for example, electron beam radiation), thermal (for example, heat or infrared radiation), or the like. In some embodiments, the energy is actinic radiation or accelerated particles, because such energy provides excellent control over the initiation and rate of polymerization and/or crosslinking Additionally, actinic radiation and accelerated particles can be used for curing at relatively low temperatures. This avoids degrading or evaporating components that might be sensitive to the relatively high temperatures that might be required to initiate polymerization and/or crosslinking of the energy curable groups when using thermal curing techniques. Suitable sources of curing energy include UV LEDs, visible LEDs, lasers, electron beams, mercury lamps, xenon lamps, carbon arc lamps, tungsten filament lamps, flashlamps, sunlight, low intensity ultraviolet light (black light), and the like.

A major portion of the solvent 120 is removed in the solvent removal step to produce the gradient nanovoided article 170. By a major portion of the solvent is meant greater than 90%, 80%, 70%, 60%, or greater than 50% by weight of the solvent. Solvent can be removed by drying in a thermal oven that can include air floatation/convection, drying with infrared or other radiant light sources, vacuum drying, gap drying, or a combination of drying techniques. The choice of drying technique can be governed by the desired process speed, extent of solvent removal, and expected coating morphology, among others. In one particular embodiment, gap drying can offer advantages for solvent removal, as gap drying offers rapid drying within minimal space.

Figure 1B:
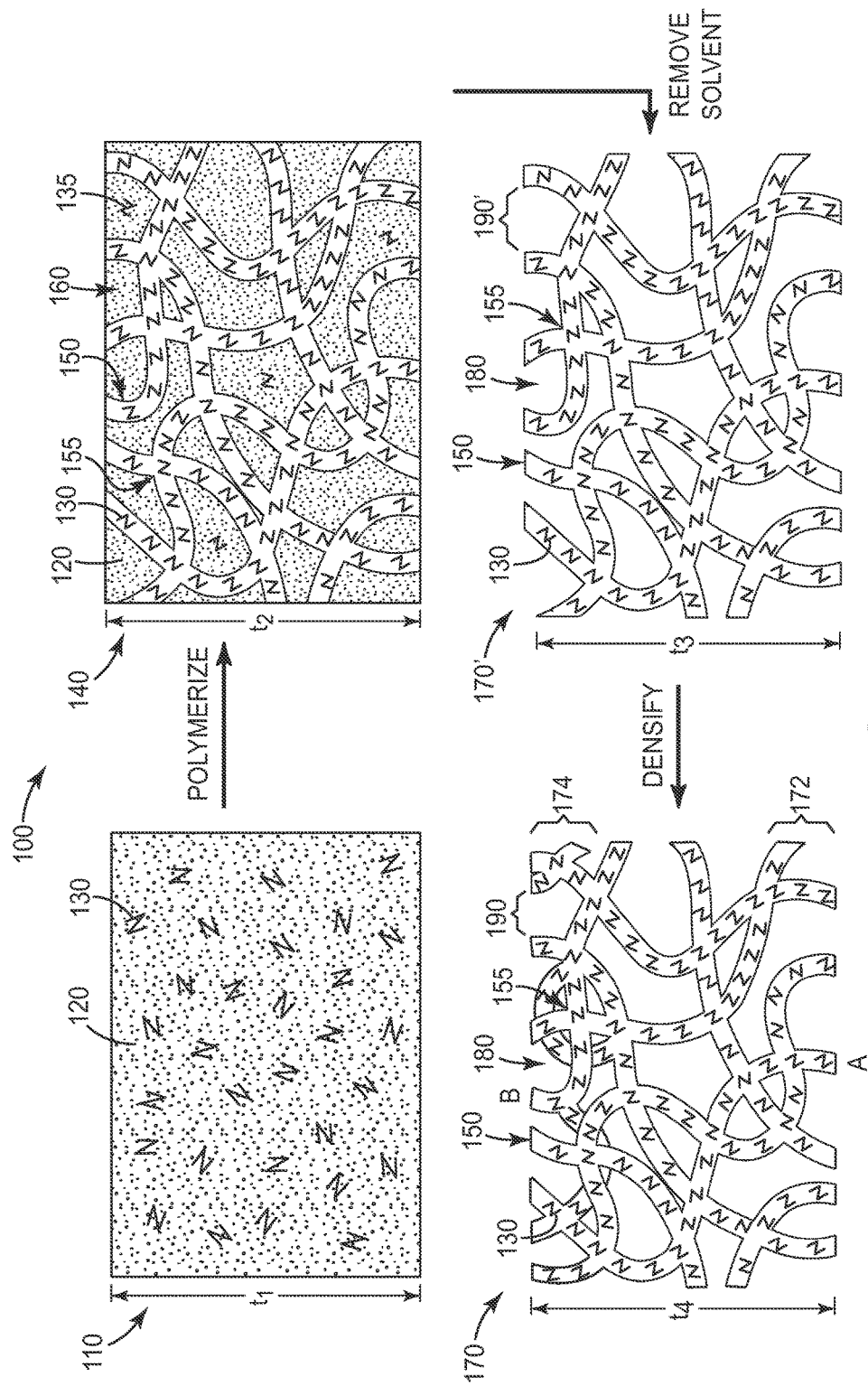

FIG. 1B shows a schematic view of a process 100 for forming a gradient nanovoided article 170 according to one aspect of the disclosure. Each of the elements 110-190 shown in FIG. 1B correspond to like-numbered elements 110-190 shown in FIG. 1A, which have been described previously. For example, the description of the first solution 110 in FIG. 1A corresponds to the description of the first solution 110 in FIG. 1B, and so on.

A first solution 110 that includes a polymerizable material 130 in a solvent 120 is provided. The polymerizable material 130 and solvent 120 can be the same as described for polymerizable material 130 and solvent 120, respectively, of FIG. 1A. The polymerizable material 130 of the first solution 110 is at least partially polymerized to form a composition 140 that includes an insoluble polymer matrix 150 in a second solution 160. A major portion of the solvent 120 is removed from the second solution 160 to form a nanovoided article 170'. The second solution 160 is depleted of the polymerizable material 130; however, some polymerizable material 130 can remain in the second solution 160, as described elsewhere. Nanovoided article 170' includes the insoluble polymer matrix 150 and a plurality of voids 180 having an average first effective diameter 190'. Although not shown in FIG. 1, it is to be understood that the first solution 110 can be coated on a substrate (not shown), to form a nanovoided coating on the substrate.

The nanovoided article 170' can be further processed to result in the gradient nanovoided article 170. In one particular embodiment, the nanovoided article 170' can be made to densify (that is, reduce the volume fraction of nanovoids) proximate a second curing environment B. In some cases, a controlled filling technique (described elsewhere) can be used to fill a portion of the voids 180 to reduce the first effective diameter 190' of the nanovoided article 170', resulting in a second effective diameter 190 of the voids 180 in a second region 174 of the gradient nanovoided article 170. In some cases, a multilayer coating technique (described elsewhere) can be used to form a second region 174 which has insufficient structural support of the insoluble polymer matrix 150, causing the nanovoided article 170' to collapse in the second region 174. In one embodiment, a first through third thickness (t1, t2, t3) of the first solution 110, the composition 140, and the gradient nanovoided article 170, respectively, are different.

Figure 2A:
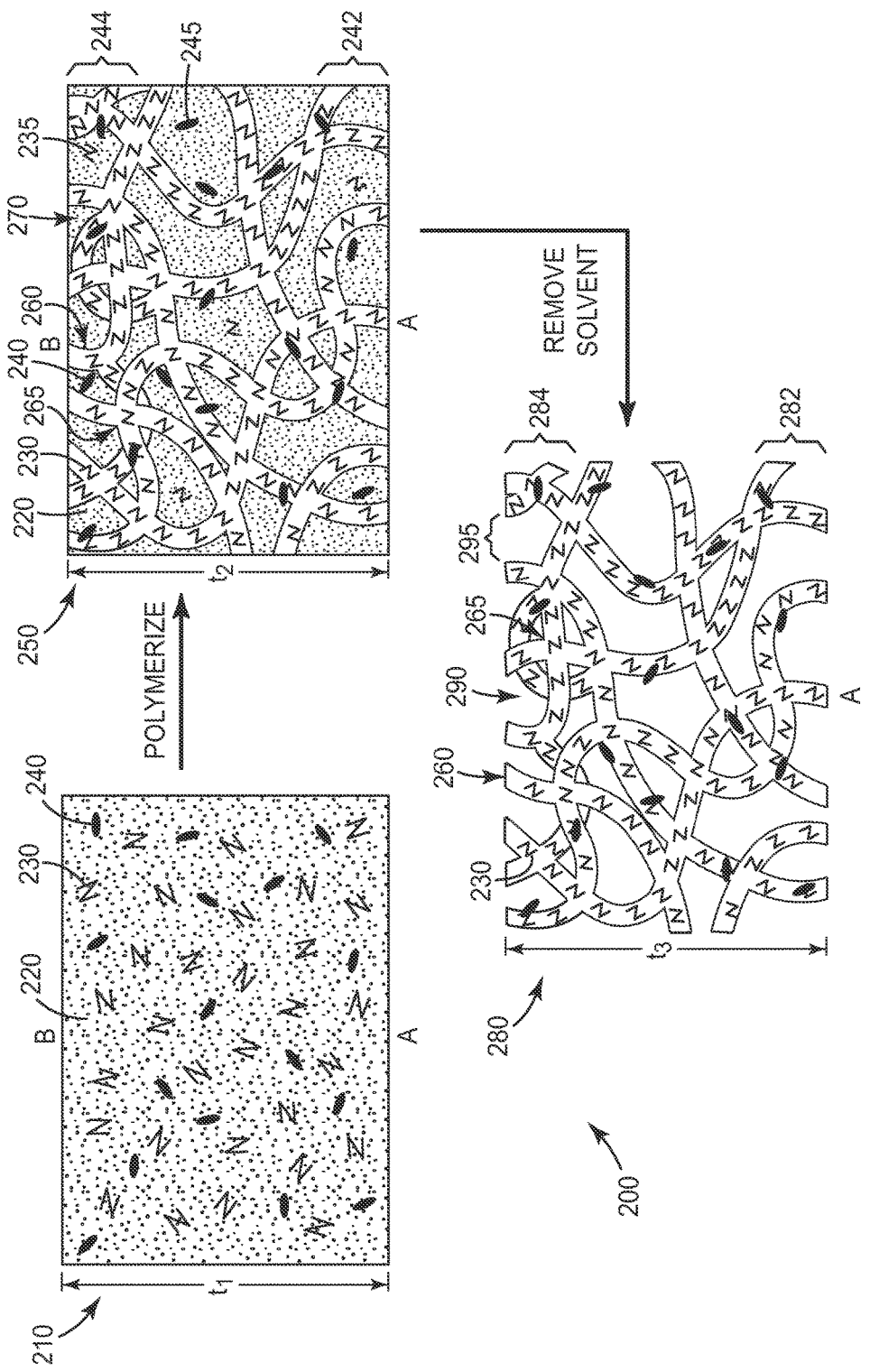
FIGS. 2A-2B are schematic views of a process for a gradient nanovoided article.

FIG. 2A shows a schematic view of a process 200 for forming a gradient nanovoided article 280 according to another aspect of the disclosure. A first solution 210 that includes a polymerizable material 230 and nanoparticles 240 in a solvent 220 is provided. A first curing environment "A" and a second curing environment "B" is provided adjacent to opposing portions of the first solution 210. Each of the first and second curing environments A, B, can represent any of the techniques described above for changing the curing environment in different regions of the coating, such as, for example, the photoinitiator concentration adjacent curing environment A can be different that the photoinitiator concentration adjacent curing environment B, and so on. The first and second curing environments A, B, can be separated by a first through third thickness (t1, t2, t3) of the first solution 210, a composition 250, and a gradient nanovoided article 280, respectively. In one embodiment, each of the first through third thickness (t1, t2, t3), are different.

The first solution 210 is at least partially polymerized to form a composition 250 including the nanoparticles 240 bound to an insoluble polymer matrix 260 in a second solution 270. A first region 242 adjacent first curing environment A can have a different volume fraction of the insoluble polymer matrix 260 than a second region 244 adjacent second curing environment B, as described elsewhere. FIG. 2A shows, for example, the first region 242 having a lower volume fraction of insoluble polymer matrix 260 than the second region 244.

A major portion of the solvent 220 is removed from the second solution 270 to form the gradient nanovoided article 280. A first region 282 adjacent first curing environment A can have a different volume fraction of the insoluble polymer matrix 260 (and a different volume fraction of nanovoids) than a second region 284 adjacent second curing environment B, as described elsewhere. FIG. 2A shows, for example, the first region 282 having a lower volume fraction of insoluble polymer matrix 260 (and a higher volume fraction of nanovoids) than the second region 284.

In one particular embodiment, the insoluble polymer matrix 260 can be a three-dimensional polymer matrix having polymer chain linkages 265 that provide the three-dimensional framework. The polymer chain linkages 265 can prevent deformation of the insoluble polymer matrix 260 after removal of the solvent 220.

In some embodiments, the second solution 270 can include some remaining polymerizable material 235 that is not incorporated in the insoluble polymer matrix 260, as shown in FIG. 2A (that is, the second solution 270 has become depleted of polymerizable material 235, but some may still be present). In one particular embodiment, it is preferred to minimize the amount of remaining polymerizable material 235 in the second solution 270, after the polymerizing step. In one particular embodiment, it may be desirable to retain a larger proportion of polymerizable material 235 adjacent one of the curing environments A or B, to reduce the porosity of the gradient nanovoided article 280 in first or second region 282, 284, as described elsewhere.

In some embodiments, the second solution 270 can also include a minor portion of nanoparticles 245 that are not bound to the insoluble polymer matrix 260, as shown in FIG. 2A (that is, the second solution 270 has become depleted of nanoparticles 240, but some may still be present). It is generally desired to minimize the quantity of nanoparticles 245 that are not bound to the insoluble polymer matrix 260 after the polymerizing step. However, in one particular embodiment, it may be desired to increase the quantity of nanoparticles 245 adjacent one of the curing environments A, B, to reduce the porosity of the gradient nanovoided article 280 in first or second region 282,284, as described elsewhere. As used herein, nanoparticles "bound to" the polymer matrix is meant to include nanoparticles completely embedded in the polymer matrix, nanoparticles partially embedded in the polymer matrix, nanoparticles attached to the surface of the polymer matrix, or a combination thereof.

In one particular embodiment, nanoparticles 240 can be surface modified reactive nanoparticles that are chemically bound to the insoluble polymer matrix 260. In one particular embodiment, nanoparticles 240 can be surface modified non-reactive nanoparticles that are physically bound to the insoluble polymer matrix 260. In one particular embodiment, nanoparticles 240 can be a mixture of surface modified reactive and non-reactive nanoparticles. In some cases, some of the nanoparticles may be functionalized with both reactive and unreactive groups on the same particle.

Gradient nanovoided article 280 includes the nanoparticles 240 bound to the insoluble polymer matrix 260, and a plurality of voids 290 having an average effective diameter 295. Both the average effective diameter 295, and the volume fraction of the voids 290 can vary throughout gradient nanovoided article 280. Although not shown in FIG. 2A, it is to be understood that the first solution 210 can be coated on a substrate to form a gradient nanovoided coating on the substrate.

The polymerizable material 230 and solvent 220 can be the same as described for polymerizable material 130 and solvent 120, respectively, of FIG. 1A. In one embodiment, the nanoparticles 240 can be inorganic nanoparticles, organic (for example, polymeric) nanoparticles, or a combination of organic and inorganic nanoparticles. In one particular embodiment, nanoparticles 240 can be porous particles, hollow particles, solid particles, or a combination thereof. Examples of suitable inorganic nanoparticles include silica and metal oxide nanoparticles including zirconia, titania, ceria, alumina, iron oxide, vanadia, antimony oxide, tin oxide, alumina/silica, and combinations thereof. The nanoparticles can have an average particle diameter less than about 1000 nm, less than about 100 nm, less than about 50 nm, or from about 3 nm to about 50 nm. In some embodiments, the nanoparticles can have an average particle diameter from about 3 nm to about 50 nm, or from about 3 nm to about 35 nm, or from about 5 to about 25 nm. If the nanoparticles are aggregated, the maximum cross sectional dimension of the aggregated particle can be within any of these ranges, and can also be greater than about 100 nm. In some embodiments, "fumed" nanoparticles, such as silica and alumina, with primary size less than about 50 nm, are also included, such as CAB-O-SPERSE® PG 002 fumed silica, CAB-O-SPERSE® 2017A fumed silica, and CAB-O-SPERSE® PG 003 fumed alumina, available from Cabot Co. Boston, Mass.

In some embodiments, the nanoparticles 240 include surface groups selected from the group consisting of hydrophobic groups, hydrophilic groups, and combinations thereof. In other embodiments, the nanoparticles include surface groups derived from an agent selected from the group consisting of a silane, organic acid, organic base, and combinations thereof. In other embodiments, the nanoparticles include organosilyl surface groups derived from an agent selected from the group consisting of alkylsilane, arylsilane, alkoxysilane, and combinations thereof.

The term "surface-modified nanoparticle" refers to a particle that includes surface groups attached to the surface of the particle. The surface groups modify the character of the particle. The terms "particle diameter" and "particle size" refer to the maximum cross-sectional dimension of a particle. If the particle is present in the form of an aggregate, the terms "particle diameter" and "particle size" refer to the maximum cross-sectional dimension of the aggregate. In some embodiments, particles can be large aspect ratio aggregates of nanoparticles, such as fumed silica particles.

The surface-modified nanoparticles have surface groups that modify the solubility characteristics of the nanoparticles. The surface groups are generally selected to render the particle compatible with the first solution 210. In one embodiment, the surface groups can be selected to associate or react with at least one component of the first solution 210, to become a chemically bound part of the polymerized network.

A variety of methods are available for modifying the surface of nanoparticles including, for example, adding a surface modifying agent to nanoparticles (for example, in the form of a powder or a colloidal dispersion) and allowing the surface modifying agent to react with the nanoparticles. Other useful surface modification processes are described in, for example, U.S. Pat. No. 2,801,185 (Iler) and U.S. Pat. No. 4,522,958 (Das et al.), and incorporated herein.

Useful surface-modified silica nanoparticles include silica nanoparticles surface-modified with silane surface modifying agents including, for example, Silquest® silanes such as Silquest® A-1230 from GE Silicones, 3-acryloyloxypropyl trimethoxysilane, 3-methacryloyloxypropyltrimethoxysilane, 3-mercaptopropyltrimethoxysilane, n-octyltrimethoxysilane, isooctyltrimethoxysilane, 4-(triethoxysilyl)-butyronitrile, (2-cyanoethyl)triethoxysilane, N-(3-triethoxysilylpropyl) methoxyethoxyethoxyethyl carbamate (PEG3TMS), N-(3-triethoxysilylpropyl) methoxyethoxyethoxyethyl carbamate (PEG2TMS), 3-(methacryloyloxy) propyltriethoxysilane, 3-(methacryloyloxy) propylmethyldimethoxysilane, 3-(acryloyloxypropyl) methyldimethoxysilane, 3-(methacryloyloxy) propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris (2-methoxyethoxy)silane, and combinations thereof. Silica nanoparticles can be treated with a number of surface modifying agents including, for example, alcohol, organosilane including, for example, alkyltrichlorosilanes, trialkoxyarylsilanes, trialkoxy(alkyl)silanes, and combinations thereof and organotitanates and mixtures thereof.

The nanoparticles may be provided in the form of a colloidal dispersion. Examples of useful commercially available unmodified silica starting materials include nano-sized colloidal silicas available under the product designations NALCO 1040, 1050, 1060, 2326, 2327, and 2329 colloidal silica from Nalco Chemical Co., Naperville, Ill.; the organosilica under the product name IPA-ST-MS, IPA-ST-L, IPA-ST, IPA-ST-UP, MA-ST-M, and MA-ST sols from Nissan Chemical America Co. Houston, Tex. and the SnowTex® ST-40, ST-50, ST-20L, ST-C, ST-N, ST-O, ST-OL, ST-ZL, ST-UP, and ST-OUP, also from Nissan Chemical America Co. Houston, Tex. The weight ratio of polymerizable material to nanoparticles can range from about 10:90, 20:80, 30:70, 40:60, 50:50, 55:45, 60:40, 70:30, 80:20 or 90:10 or more. The preferred ranges of wt % of nanoparticles range from about 10% by weight to about 60% by weight, and can depend on the density and size of the nanoparticle used.

Figure 2B:
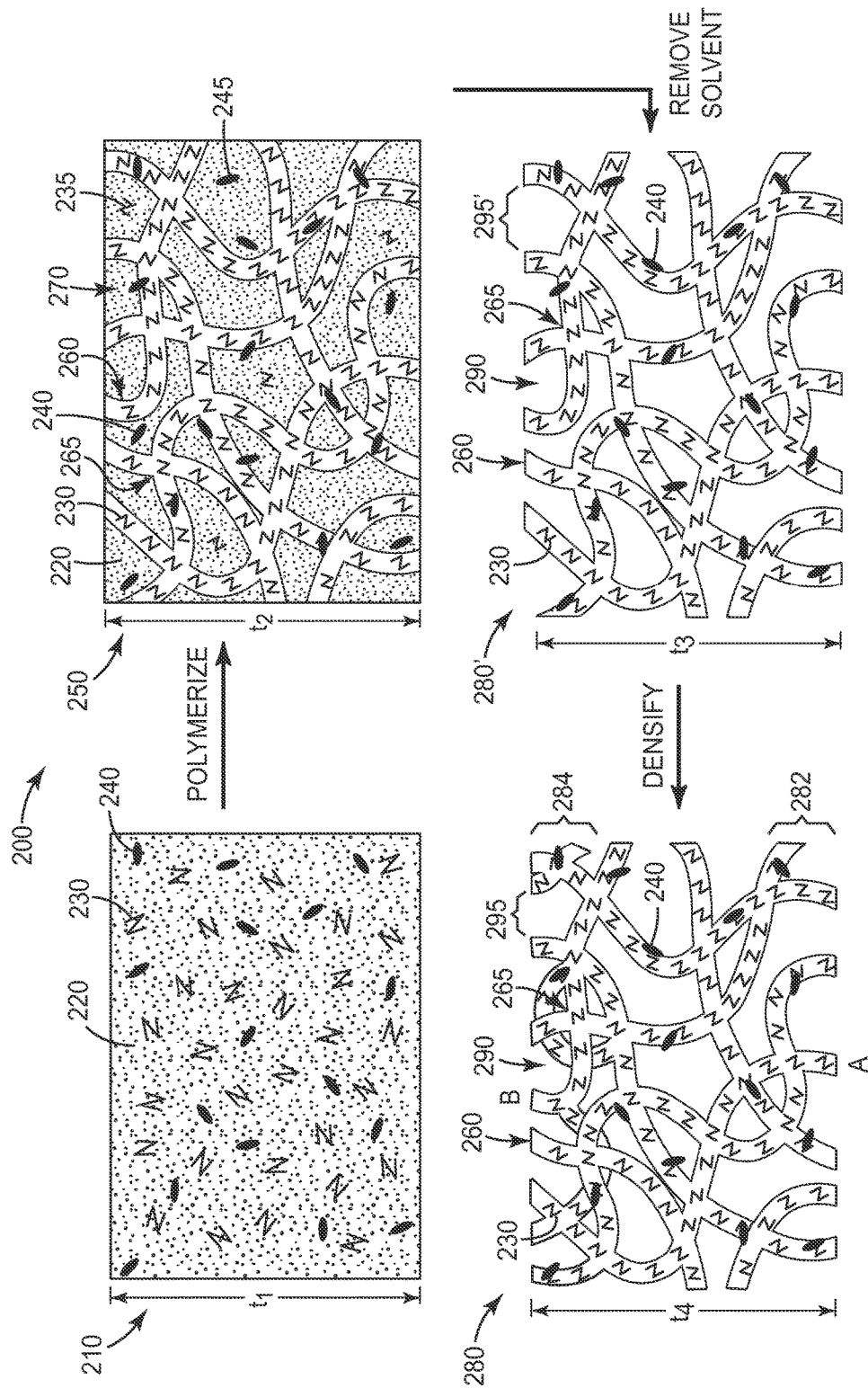

FIG. 2B shows a schematic view of a process 200 for forming a gradient nanovoided article 280 according to another aspect of the disclosure. Each of the elements 210-290 shown in FIG. 2B correspond to like-numbered elements 210-290 shown in FIG. 2A, which have been described previously. For example, the description of the first solution 210 in FIG. 2A corresponds to the description of the first solution 210 in FIG. 2B, and so on.

A first solution 210 that includes a polymerizable material 230 and nanoparticles 240 in a solvent 220 is provided. The polymerizable material 230, solvent 220, and nanoparticles 240 can be the same as described for polymerizable material 230, solvent 220, and nanoparticles 240, respectively, of FIG. 2A. The first solution 210 is at least partially polymerized to form a composition 250 including the nanoparticles 240 bound to an insoluble polymer matrix 260 in a second solution 270. A major portion of the solvent 220 is removed from the second solution 270 to form a nanovoided article 280'. In one particular embodiment, the insoluble polymer matrix 260 can be a three-dimensional polymer matrix having polymer chain linkages 265 that provide the three-dimensional framework. The polymer chain linkages 265 can prevent deformation of the insoluble polymer matrix 260 after removal of the solvent 220.

In some embodiments, the second solution 270 can include some remaining polymerizable material 235 that is not incorporated in the insoluble polymer matrix 260, as shown in FIG. 2B (that is, the second solution 270 has become depleted of polymerizable material 235, but some may still be present). In one particular embodiment, it is preferred to minimize the amount of remaining polymerizable material 235 in the second solution 270, after the polymerizing step.

In some embodiments, the second solution 270 can also include a minor portion of nanoparticles 245 that are not bound to the insoluble polymer matrix 260, as shown in FIG. 2 (that is, the second solution 270 has become depleted of nanoparticles 240, but some may still be present). It is generally desired to minimize the quantity of nanoparticles 245 that are not bound to the insoluble polymer matrix 260 after the polymerizing step.

The nanovoided article 280' includes the nanoparticles 240 bound to the insoluble polymer matrix 260, and a plurality of voids 290 having a first average effective diameter 295'. Although not shown in FIG. 2B, it is to be understood that the first solution 210 can be coated on a substrate to form a nanovoided coating on the substrate.

The nanovoided article 280' can be further processed to result in the gradient nanovoided article 280. In one particular embodiment, the nanovoided article 280' can be made to densify (that is, reduce the volume fraction of nanovoids) proximate a second curing environment B. In some cases, a controlled filling technique (described elsewhere) can be used to fill a portion of the voids 290 to reduce the first effective diameter 295' of the nanovoided article 280', resulting in a second effective diameter 295 of the voids 290 in a second region 284 of the gradient nanovoided article 280. In some cases, a multilayer coating technique (described elsewhere) can be used to form a second region 284 which has insufficient structural support of the insolumble polymer matrix 260, causing the nanovoided article 280' to collapse in the second region 284. In one embodiment, a first through fourth thickness (t1, t2, t3, t4) of the first solution 210, the composition 250, the nanovoided article 280' and the gradient nanovoided article 280, respectively, are different.

Figure 3A:
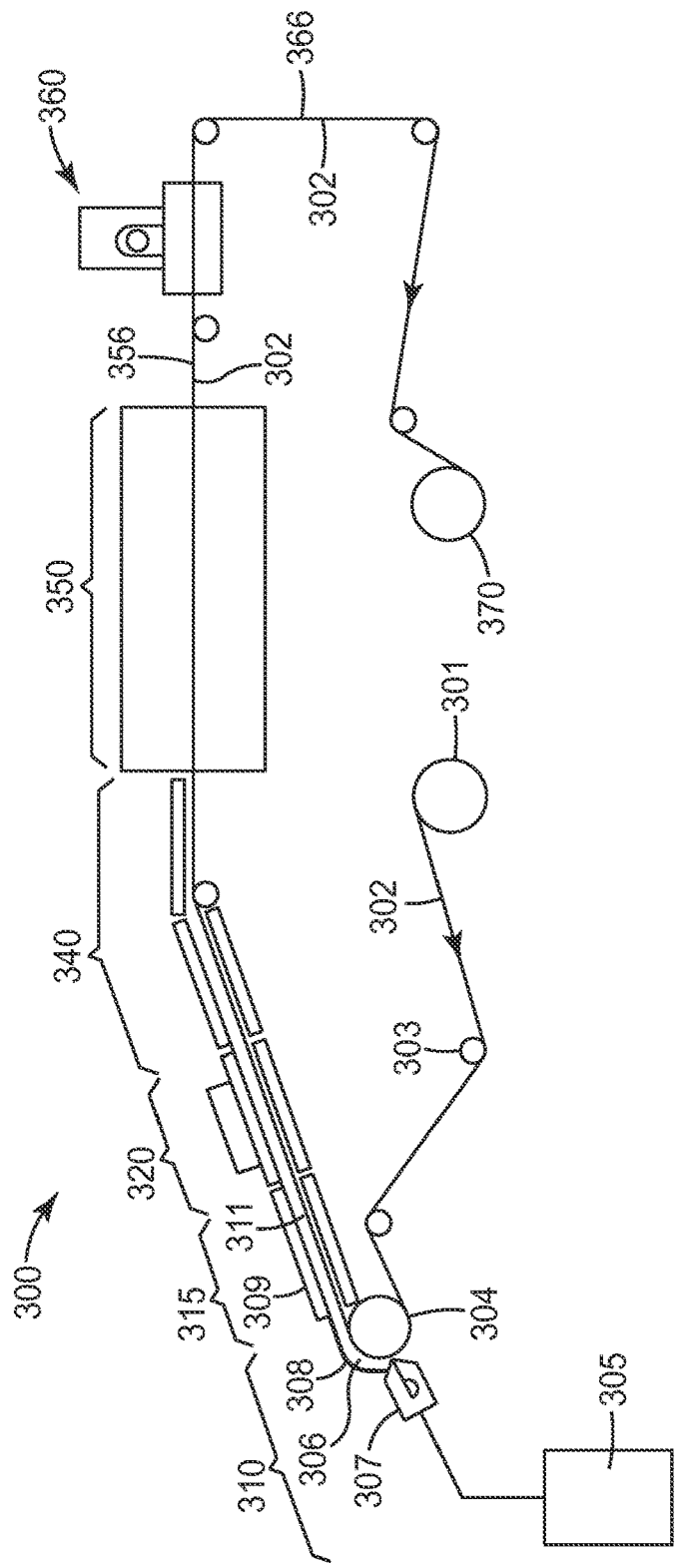
FIG. 3A is a schematic view of a process for a gradient nanovoided coating.

FIG. 3A shows a schematic view of a process 300 for forming a gradient nanovoided coating 356 on a substrate 302, according to one aspect of the disclosure. The process 300 shown in FIG. 3A is a continuous process, although it is to be understood that the process can instead be performed in a stepwise manner, that is, the steps of coating, polymerizing, and removing solvent described below can be performed on individual substrate pieces in discrete operations, to form the gradient nanovoided coating The process 300 shown in FIG. 3A passes a substrate 302 through a coating section 310, an optional coating conditioning section 315, a polymerization section 320, a first solvent removal section 340, and an optional second solvent removal section 350 to form the gradient nanovoided coating 356 on the substrate 302. Gradient nanovoided coating 356 on substrate 302 then passes through optional second polymerization section 360 to form an optionally post-cured gradient nanovoided coating 366 on the substrate 302, which is then wound up as an output roll 370. In some embodiments, process 300 can include additional processing equipment common to the production of web-based materials, including, for example, idler rolls; tensioning rolls; steering mechanisms; surface treaters such as corona or flame treaters; lamination rolls; and the like. In some embodiments, the process 300 can utilized different web paths, coating techniques, polymerization apparatus, positioning of polymerization apparatus, drying ovens, conditioning sections, and the like, and some of the sections described can be optional.

The substrate 302 can be any known substrate suitable for roll-to-roll web processing in a webline, including, for example, polymeric substrates, metalized polymeric substrates, metal foils, combinations thereof, and the like. In one particular embodiment, the substrate 302 is an optical quality polymeric substrate, suitable for use in an optical display such as a liquid crystal display. In one particular embodiment, the substrate 302 can be a substrate having a primer coating, such as, for example, a photoinitiator or a polymerization inhibitor, as described elsewhere. The primer coating, if provided, can be coated (not shown) immediately before the coating section 310 or it can be coated in a separate step prior to being loaded as an input roll 301.

The substrate 302 is unwound from the input roll 301, passes over idler rolls 303 and contacts coating roll 304 in coating section 310. A first solution 305 passes through a coating die 307 to form a first coating 306 of first solution 305 on substrate 302. The first solution 305 can include solvents, polymerizable materials, optional nanoparticles, photoinitiators, and any of the other first solution components described elsewhere. A shroud 308 positioned between the coating die 307 in the coating section 310, and a coating conditioning region 309 in the optional coating conditioning section 315, can provide a first controlled environment 311 surrounding the first solution 305. In some embodiments, the shroud 308 and optional coating conditioning section 315 can be optional, for example, when the polymerization occurs before substantial change can occur in the composition of the first solution 305. The substrate 302 having the first coating 306 of first solution 305 then enters the polymerization section 320 where the first solution 305 is polymerized, as described elsewhere.

The coating die 307 can include any known coating die and coating technique, and is not to be limited to any specific die design or technique of coating thin films. Examples of coating techniques include knife coating, gravure coating, slide coating, slot coating, slot-fed knife coating, curtain coating, multilayer coating, and the like as known to those skilled in the art. Several applications of the gradient nanovoided article can include the need for precise thickness and defect-free coatings, and may require the use of a precise slot coating die 307 positioned against a precision coating roll 304 as shown in FIG. 3A. The first coating 306 can be applied at any thickness; however thin coatings are preferred, for example coatings less than 1000 microns thick, less than about 500 microns thick, less than about 100 microns thick, or even less than about 10 microns thick, can provide gradient nanovoided articles having exemplary properties.

Because the first coating 306 includes at least one solvent and a polymerizable material as described elsewhere, the shroud 308 is positioned to reduce any undesired loss of solvent from the coating, and also to protect the coating from oxygen which can inhibit the polymerization. The shroud 308 can be, for example, a formed aluminum sheet that is positioned in close proximity to the first coating 306 and provides a seal around the coating die 307 and the coating roll 304 so that the first controlled environment 311 can be maintained. In some embodiments, the shroud 308 can also serve to protect the coating from ambient room conditions, or to provide an oxygen rich atmosphere, as described elsewhere.

The first controlled environment 311 can include inerting gases such as nitrogen to control oxygen content, solvent vapors to reduce the loss of solvent, or a combination of gases such as air, inerting gases such as nitrogen, and solvent vapors. The oxygen concentration can affect both the rate and extent of polymerization, so in one embodiment, the oxygen concentration in the first controlled environment 311 is reduced to less than 1000 parts-per-million (ppm), less than 500 ppm, less than 300 ppm, less than 150 ppm, less than 100 ppm, or even less than 50 ppm. In some cases, the lowest oxygen concentration that can be attained is preferred. In one particular embodiment, the oxygen concentration in the first controlled environment is increased to greater than 100 ppm, greater than 500 ppm, greater than 1000 ppm, greater than 2000 ppm, greater than 5000 ppm, or more, to inhibit polymerization adjacent the free surface of the coating, as described elsewhere.

The coating conditioning region 309 in the optional coating conditioning section 315 is an extension of the shroud 308 that provides additional capabilities to modify the first coating 306 before entering the polymerization section 320. The first controlled environment 311 can still be maintained within coating conditioning region 309. In other embodiments, additional heating, cooling, or input and exhaust gases can be provided to adjust or maintain the composition of the first coating 306. For example, solvent vapor can be introduced in the input gas to reduce evaporation of solvent from the first coating 306 prior to polymerization. In one particular embodiment, an external field can be applied to the coating in the optional coating conditioning section 315 to cause migration of particulates to different regions of the first coating, as described elsewhere.

A heating apparatus, such as a gap dryer described, for example, in U.S. Pat. No. 5,694,701 can be used to raise or lower the temperature of first coating 306, drive off additional solvent to adjust the composition of first coating 306, or both. The gap dryer could also be used to remove a portion of the solvent before the polymerization section to enable the desired thin film morphology by altering the composition, for example when the optimum composition of the coating (for example, % solids) is different from the optimum composition for polymerization. Often, coating conditioning region 309 can serve to provide additional time for the first coating 306 to stabilize, for example, to smooth any surface ripples or streaks, prior to polymerization.

Figure 3B:
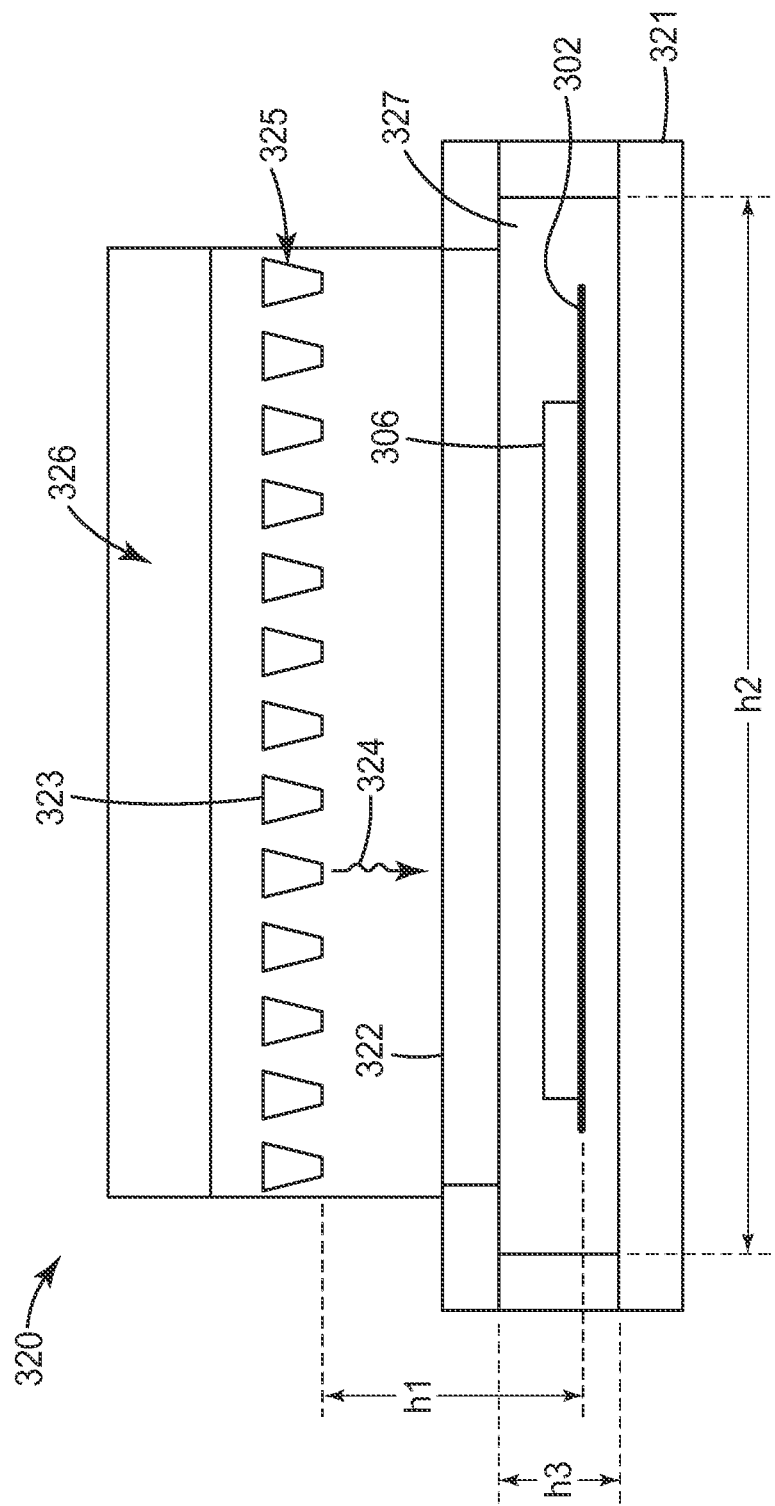
FIG. 3B is a schematic view of a polymerization section of FIG. 3A.

FIG. 3B is a schematic view of the polymerization section 320 of process 300 shown in FIG. 3A, according to one aspect of the disclosure. FIG. 3B shows a cross-section of the polymerization section 320 as viewed down the path of the substrate 302. Polymerization section 320 includes a housing 321 and a quartz plate 322 that provide boundaries of a second controlled environment 327 that partially surrounds the first coating 306 on substrate 302. A radiation source 323 generates actinic radiation 324 that passes through quartz plate 322 and polymerizes the first coating 306 on substrate 302. Instead of a single radiation source 323, a radiation source array 325 shown in FIG. 3B can provide improved uniformity and rate of polymerization to the polymerization process. The radiation source array 325 can provide individual control of radiation source 323, for example, crossweb or downweb profiles can be generated as desired. A heat extractor 326 can be positioned to control the temperature by removing heat generated by each radiation source 323 in the radiation source array 325.

The housing 321 can be a simple enclosure designed to surround the substrate 302, first coating 306, and an at least partially polymerized second coating 336 (shown in FIG. 3C), or the housing 321 can also include additional elements, such as, for example, temperature controlled plates (not shown) that can adjust the temperature of a second controlled environment 327. The housing 321 has sufficient interior dimensions "h3" and "h2" to enclose substrate 302 and first coating 306 to provide the second controlled environment 327. The gas flow fields impact inerting capabilities, coating composition, coating uniformity and the like. As shown in FIG. 3B, the housing 321 includes a top quartz plate 322 separating the second controlled environment 327 from radiation source 323 in radiation source array 325. The radiation source array 325 is positioned a distance "h1" from the substrate 302 to provide uniform actinic radiation 324 to the first coating 306. In one embodiment, "h1" and "h3" are 1 inch (2.54 cm) and 0.25 inch (0.64 cm), respectively. In some embodiments (not shown), the polymerization section 320 can be inverted so that the quartz plate 322 and radiation source 323 are located beneath the substrate 302, and actinic radiation 324 passes through the substrate 302 before polymerizing first coating 306. In other embodiments (also not shown), the polymerization section 320 can include two quartz plates 322 and two radiation sources 323, located above and below the substrate, to polymerize first coating 306.

The radiation source 323 can be any source of actinic radiation as described elsewhere. In some embodiments, radiation source 323 is an ultraviolet LED that is capable of producing UV radiation. A combination of radiation sources emitting at different wavelengths can be used to control the rate and extent of the polymerization reaction. The UV-LEDs or other radiation sources can generate heat during operation, and the heat extractor 326 can be fabricated from, for example, a metal such as aluminum that is cooled by either air or water to control the temperature by removing the generated heat.

Figure 3C:
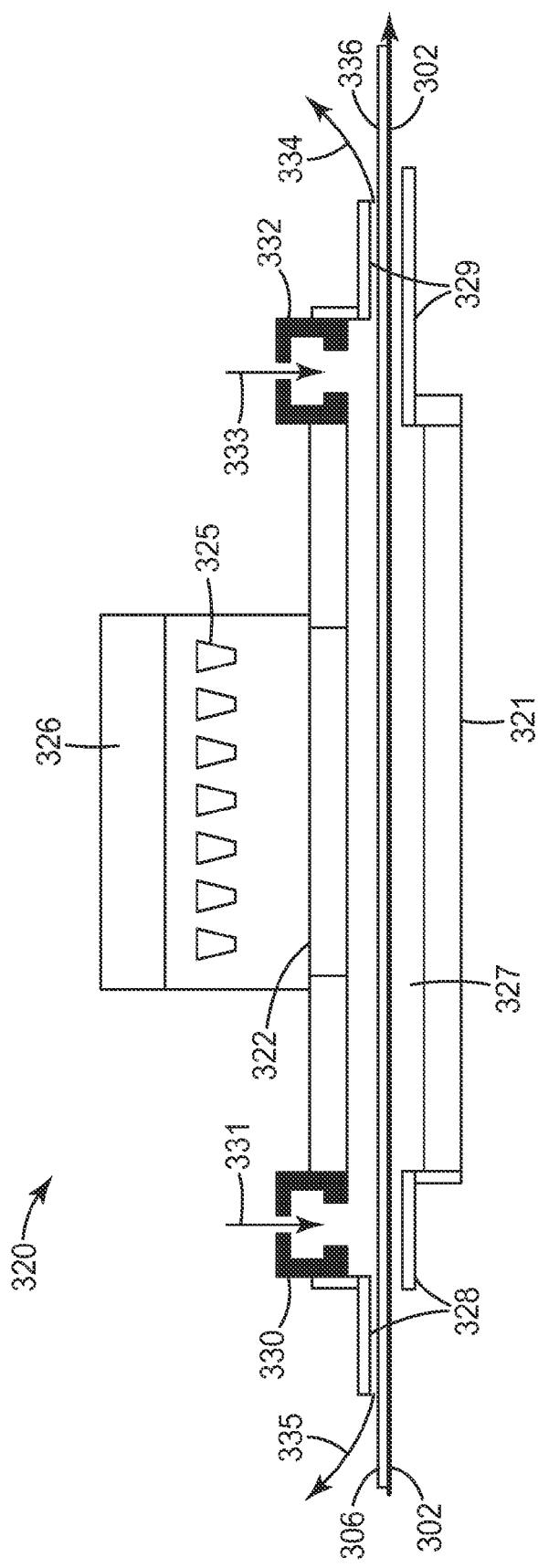
FIG. 3C is schematic view of the polymerization section of FIG. 3B.

FIG. 3C is a schematic view of the polymerization section 320 of process 300 shown in FIG. 3A, according to one aspect of the disclosure. FIG. 3C shows a cross-section of the polymerization section 320 as viewed along an edge of the substrate 302. Polymerization section 320 includes the housing 321 and the quartz plate 322 that provide boundaries of the second controlled environment 327. The second controlled environment 327 partially surrounds the first coating 306 and the at least partially polymerized second coating 336 on substrate 302. At least partially polymerized second coating 336 includes an insoluble polymer matrix in a second solution, as described elsewhere.

The second controlled environment 327 will now be described. Housing 321 includes an entrance aperture 328 and an exit aperture 329 that can be adjusted to provide any desired gap between the substrate 302, the coating 306 on substrate 302, and the respective aperture. The second controlled environment 327 can be maintained by control of the temperature of the housing 321, and appropriate control of the temperature, composition, pressure and flow rate of a first input gas 331, a second input gas 333, a first output gas 335 and a second output gas 334. Appropriate adjustment of the sizes of the entrance and exit apertures 328, 329 can aid control of the pressure and flow rate of the first and second output gases 335, 334, respectively.

The first output gas 335 can flow from the second controlled environment 327 through the entrance aperture 328 and into the first controlled environment 311 of optional coating conditioning section 315, shown in FIG. 3A. In some embodiments, the pressure within the second controlled environment 327 and the first controlled environment 311 are adjusted to prevent flow between the two environments, and first output gas 335 can exit second controlled environment 327 from another location (not shown) within housing 321. The second output gas 334 can flow from the second controlled environment 327 through the exit aperture 329, and into the first solvent removal section 340 shown in FIG. 3A, or the second output gas 334 can exit second controlled environment 327 from another location (not shown) within housing 321.

A first input gas manifold 330 is positioned adjacent the housing 321 proximate the entrance aperture 328, to distribute the first input gas 331 with desired uniformity across the width of the first coating 306. A second input gas manifold 332 is positioned adjacent the housing 321 proximate the exit aperture 329, to distribute the second input gas 333 with desired uniformity across the width of the second coating 336. First and second input gases 331, 333 can be distributed above the web, below the web, or in any combination of above and below the web, as desired. First and second input gases 331, 333 can be the same or they can be different, and can include inerting gasses such as nitrogen, which can reduce oxygen concentration that can inhibit the polymerization reaction, as is known. First and second input gases 331, 333 can also include solvent vapors that can help reduce the loss of solvent from first coating 306 before or during polymerization, as described elsewhere. The relative flow rates, flow velocities, flow impingement or orientation on the coating, and temperature of each of the first and second input gases 331, 333 can be controlled independently, and can be adjusted to reduce imperfections in the first coating 306 prior to polymerization. The imperfections can be caused by disturbances to the coating, as known in the art. In some cases, only one of the first and second input gases 331, 333 may be flowing.

Returning now to FIG. 3A, the remainder of the process will be described. After leaving polymerization section 320, second polymerized coating 336 on substrate 302 enters first solvent removal section 340. First solvent removal section 340 can be a conventional drying oven that removes solvent by heating the second polymerized coating 336 to evaporate the solvent. A preferred first solvent removal section 340 is a gap dryer, such as described, for example, in U.S. Pat. Nos. 5,694,701 and 7,032,324. A gap dryer can provide greater control of the drying environment, which may be desired in some applications. An optional second solvent removal section 350 can further be used to ensure that a major portion of the solvent is removed.

A gradient nanovoided coating 356 on substrate 302 exits optional second solvent removal section 350 and then passes through optional second polymerization section 360 to form an optionally post-cured gradient nanovoided coating 366 on the substrate 302. Optional second polymerization section 360 can include any of the actinic radiation sources previously described, and can increase the extent of cure of the gradient nanovoided coating 356. In some embodiments, increasing the extent of cure can include polymerizing remaining polymerizable material (that is, remaining polymerizable material 135, 235, shown in FIG. 1 and FIG. 2, respectively) after removal of the solvent. Gradient nanovoided coating 356 on substrate 302 exits optional second polymerization section 360 and is then wound up as an output roll 370. In some embodiments, output roll 370 can have other desired films (not shown) laminated to the gradient nanovoided coating and simultaneously wound on the output roll 370. In other embodiments, additional layers (not shown) can be coated, cured, and dried on either the gradient nanovoided coating 356 or the substrate 302, as described elsewhere.

Figure 4A:
FIG. 4A is a cross-sectional micrograph of a gradient optical film.
Figure 4B:
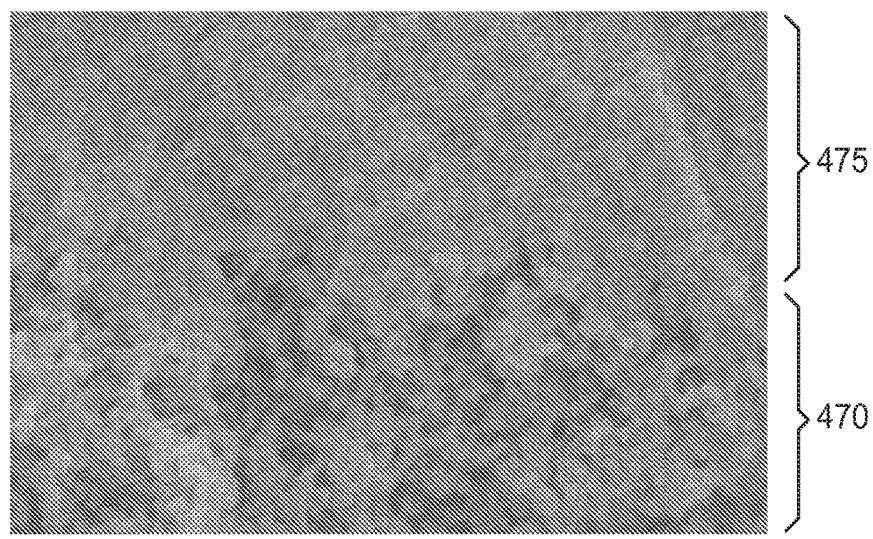
FIG. 4B is a higher magnification of the micrograph in FIG. 4A.

FIG. 4A is a cross-sectional micrograph of a gradient optical film 400 coated on a substrate 410, according to one aspect of the disclosure. The gradient optical film 400 includes a first major surface 430 adjacent to the substrate 410, and a first local volume fraction of interconnected voids 470 proximate the first major surface 430. The gradient optical film further includes a second major surface 432 that is a "free" surface, (that is, adjacent the curing environment) and a densified second local volume fraction of interconnected voids 475 proximate the second major surface 432. The gradient optical film 400 was prepared in an oxygen rich environment (3578 ppm oxygen, according to Sample 1a in Example 1, below) which inhibited the polymerization proximate the second major surface 432. FIG. 4B is a higher magnification of the micrograph in FIG. 4A, and more clearly shows that the first local volume fraction of interconnected voids 470 is greater than the densified second volume fraction of interconnected voids 475, which has become densified due to the inhibited polymerization.

Figure 5A:
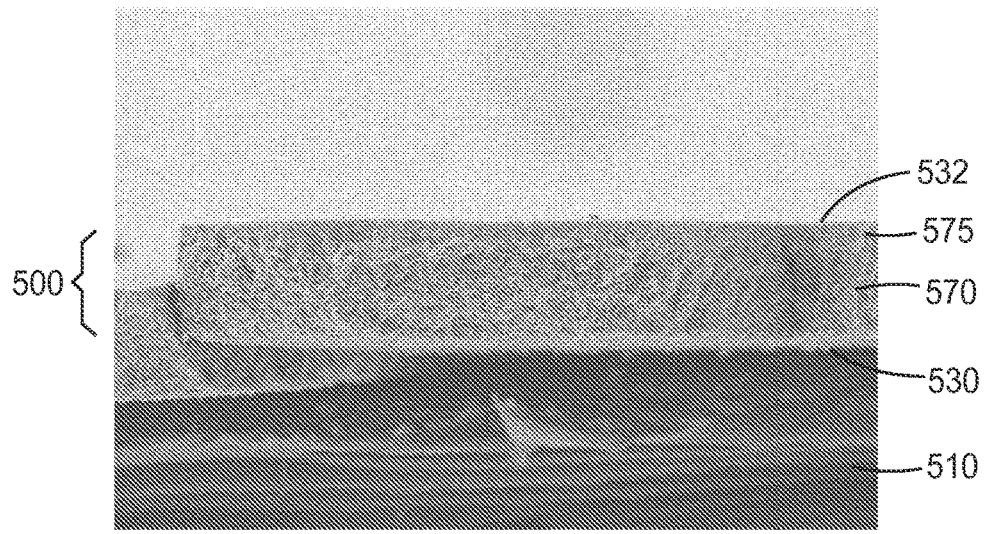
FIG. 5A is a cross-sectional micrograph of a gradient optical film.
Figure 5B:
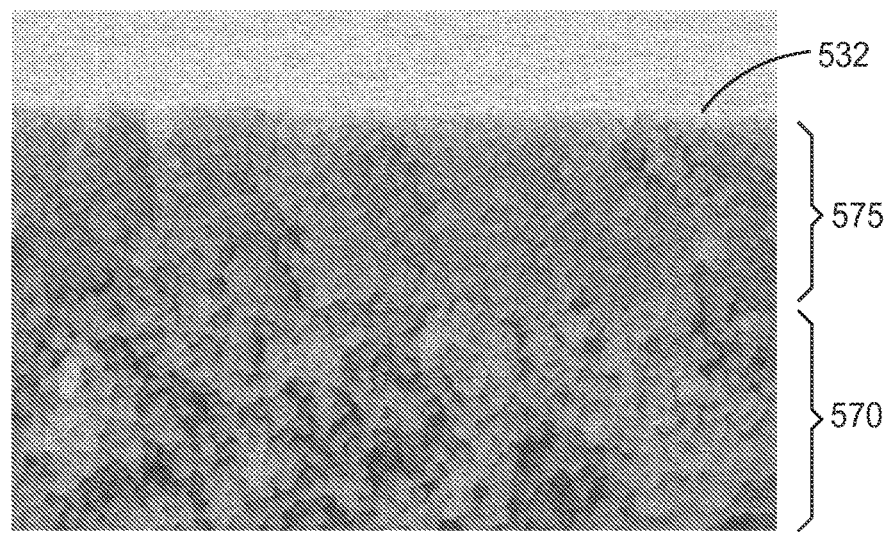
FIG. 5B is a higher magnification of the micrograph in FIG. 5A.

FIG. 5A is a cross-sectional micrograph of a gradient optical film 500 coated on a substrate 510, according to one aspect of the disclosure. The gradient optical film 500 includes a first major surface 530 adjacent to the substrate 510, and a first local volume fraction of interconnected voids 570 proximate the first major surface 530. The gradient optical film further includes a second major surface 532 that is a "free" surface, (that is, adjacent the curing environment) and a densified second local volume fraction of interconnected voids 575 proximate the second major surface 532. The gradient optical film 500 was prepared in lower oxygen rich environment (1707 ppm oxygen, according to Sample 3a in Example 1, below), than the gradient optical film 500 of FIGS. 5A-5B. The oxygen rich environment inhibited the polymerization proximate the second major surface 532. FIG. 5B is a higher magnification of the micrograph in FIG. 5A, and more clearly shows that the first local volume fraction of interconnected voids 570 is greater than the densified second volume fraction of interconnected voids 575, which has become densified due to the inhibited polymerization. Comparison of the relative thickness of the densified second volume fraction of interconnected voids 475 and 575 shows the increase in the thickness of the densified region with an increase in the oxygen concentration in the curing environment.

Some of the advantages of the disclosed films, layers, constructions, and systems are further illustrated by the following examples. The particular materials, amounts and dimensions recited in this example, as well as other conditions and details, should not be construed to unduly limit the present invention.

In the examples, the index of refraction was measured using a Metricon Model 2010 Prism Coupler (available from Metricon Corp., Pennington, N.J.). Optical transmittance, clarity, and haze were measured using a Haze-Gard Plus haze meter (available from BYK-Gardner, Silver Springs, Md.).

EXAMPLES

Example A—Photoinitiator Priming on DBEF to Generate Gradient

A photoinitiator was coated on a substrate to generate the change in density from the substrate interface to an air interface. The photoinitiator coating solution was prepared by mixing 0.3% by weight of Irgacure 819 in MEK. This photoinitiator solution was coated onto a DBEF film using a 43.2 cm (17 inch) wide slot-type coating die. The solution was coated at a rate of 127 g/min and a line speed of 30.5 m/min (100 feet/min). The coating was then dried in an oven at 150° F. (66° C.). This resulted in a photoinitiator primed substrate.

A coating solution "A" was made. First, 360 g of Nalco 2327 colloidal silica particles (40% wt solid and an average particle diameter of about 20 nanometers) and 300 g of 1-methoxy-2-propanol were mixed together under rapid stirring in a 2-liter three-neck flask that was equipped with a condenser and a thermometer. Next, 22.15 g of Silquest A-174 silane was added, and the mixture was stirred for 10 minutes. An additional 400 g of 1-methoxy-2-propanol was then added, and the mixture was heated at 85° C. for 6 hours using a heating mantle. The resulting solution was allowed to cool down to room temperature, and most of water and 1-methoxy-2-propanol solvents (about 700 g) were removed using a rotary evaporator under a 60° C. water-bath. The resulting solution was a clear A-174 modified silica solution having 44% wt A-174 modified 20 nm silica, dispersed in 1-methoxy-2-propanol.

The coating solution "A" was composed of 18.0 wt % of the clear A-174 modified silica solution (having 44% wt A-174 modified 20 nm silica dispersed in 1-methoxy-2-propanol), 23.9 wt % 1-methoxy-2-propanol, 46.1 wt % IPA, 12.0 wt % SR444. Irgacure 819 was added to coating solution "A" at a rate 0.15 parts per hundred (pph). Coating solution A was pumped (using a pressure pot) at a rate of 15.2 g/min into a 43.2 cm (17 inch) wide slot-type coating die. The slot coating die uniformly distributed a 43.2 cm wide coating onto the photoinitiator primed substrate at a speed of 1.52 m/min (10 ft/min).

Next, the coating was polymerized by passing the coated substrate through a UV-LED cure chamber that included a quartz window to allow passage of UV radiation. The UV-LED cure chamber included a rectangular array of 160 UV-LEDs, 4 down-web by 40 cross-web (approximately covering a 42.5 cm×4.5 cm area). The LEDs (available from Nichia Inc., Tokyo Japan) operated at a nominal wavelength of 385 nm and were run at 8 Amps, resulting in a UV-A dose of 0.052 joules per square cm. The fan-cooled UV-LED array was powered by a Lambda GENH 60-12.5-U power supply (available from TDK-Lambda, Neptune N.J.). The UV-LEDs were positioned above the quartz window of the cure chamber at a distance of approximately 2.5 cm from the substrate. The UV-LED cure chamber was supplied with a flow of nitrogen at a flow rate of 141.6 liters/min (5 cubic feet per minute). Air was introduced into the nitrogen supply to control the total oxygen level in the UV-LED chamber. The oxygen level in the UV-LED cure chamber was varied by changing the airflow rate, and the oxygen level was monitored using a Series 3000 oxygen analyzer (available from Alpha Omega Instruments, Cumberland R.I.).

After being polymerized by the UV-LEDs, the solvent in the cured coating was removed by transporting the coated substrate to a drying oven at 150° F. (66° C.) for 2 minutes at a web speed of 10 ft/min. Next, the dried coating was post-cured using a Fusion System Model 1600 configured with a D-bulb (available from Fusion UV Systems, Gaithersburg Md.). The UV Fusion chamber was supplied with a flow of nitrogen that resulted in an oxygen concentration of approximately 50 ppm in the chamber.

Example B—Volume Diffuser Overcoat on Gradient Optical Film

A volume diffuser coating solution 'B' was made by mixing 27.4 g of 1-methoxy-2-propanol, 27.2 g of methanol, 29.6 g of KSR3 polystyrene beads, 8.1 g of Photomer 6210, 3.6 g of SR833S, 4.2 g of SR9003, and 0.4 g of Darocur 4265.

Volume diffuser coating solution 'B' was coated on substrates using a notched bar coating apparatus at a gap thickness of 127 microns. The coating was dried at 150° F. (66° C.) for 2 min, then cured using a Fusion System Model 1600 (Fusion UV Systems, Gaithersburg Md.) at 13.7 m/min. The Model 1600 was configured with a D-bulb and operated at 100% power. The UV Fusion chamber was supplied with a flow of nitrogen that resulted in an oxygen concentration of approximately 50 ppm in the cure chamber.

Example 1—Refractive Index and Densified Layer Change in Gradient Optical Film Coating solution A was coated on photoinitiator primed DBEF reflective polarizer film according to Example A, to produce a series of coated films. The curing conditions for each coated film were the same, but with variable air flow rates and oxygen levels.

Transmission and haze were measured using a BYK-Gardner Haze-Gard. The refractive index (RI) of the coating was measured using a Model 2010 Prism Coupler (available from Metricon Corporation, Pennington N.J.). The Model 2010 Metricon was configured with a HeNe laser operating at a wavelength of 632.8 nm and an optical prism (code 6567.9). The measurements were made in both the TE and TM modes. To determine the film side refractive index of the coating, the sample was loaded such that the substrate was in intimate contact with the prism coupler. To determine the air side refractive index of the coating, the sample was loaded such that the coating was in intimate contact with the prism coupler. Results of the measurements on each of the coatings are summarized in Table 1.

TABLE 1

| Sample | Air Flow (cc/min) | O2 (ppm) | Trans (%) | Haze (%) | RI (air side) | RI (film side) | ΔRI |
|---|---|---|---|---|---|---|---|
| 1a | 2000 | 3578 | 48.1 | 8.4 | 1.47 | 1.32 | 0.15 |
| 2a | 3000 | 5640 | 48.7 | 0.8 | 1.49 | 1.49 | 0.00 |
| 3a | 1000 | 1707 | 47.8 | 6.4 | 1.44 | 1.27 | 0.17 |

Scanning Electron Micrographs (SEMs) of the gradient optical film were obtained. First, a representative sample of the gradient optical film was selected. Next, the sample was frozen in liquid nitrogen. Then, the sample was fractured immediately after it was removed from the liquid nitrogen to expose a cross-section of the gradient optical film along the thickness direction. Next, the sample was sputtered with an approximately 1 nm thick layer of a gold/palladium alloy to reduce electrical charging of the sample in subsequent processing. The top surface and the cross-section of the gradient optical film were then imaged using a scanning electron microscope.

Figure 6A:
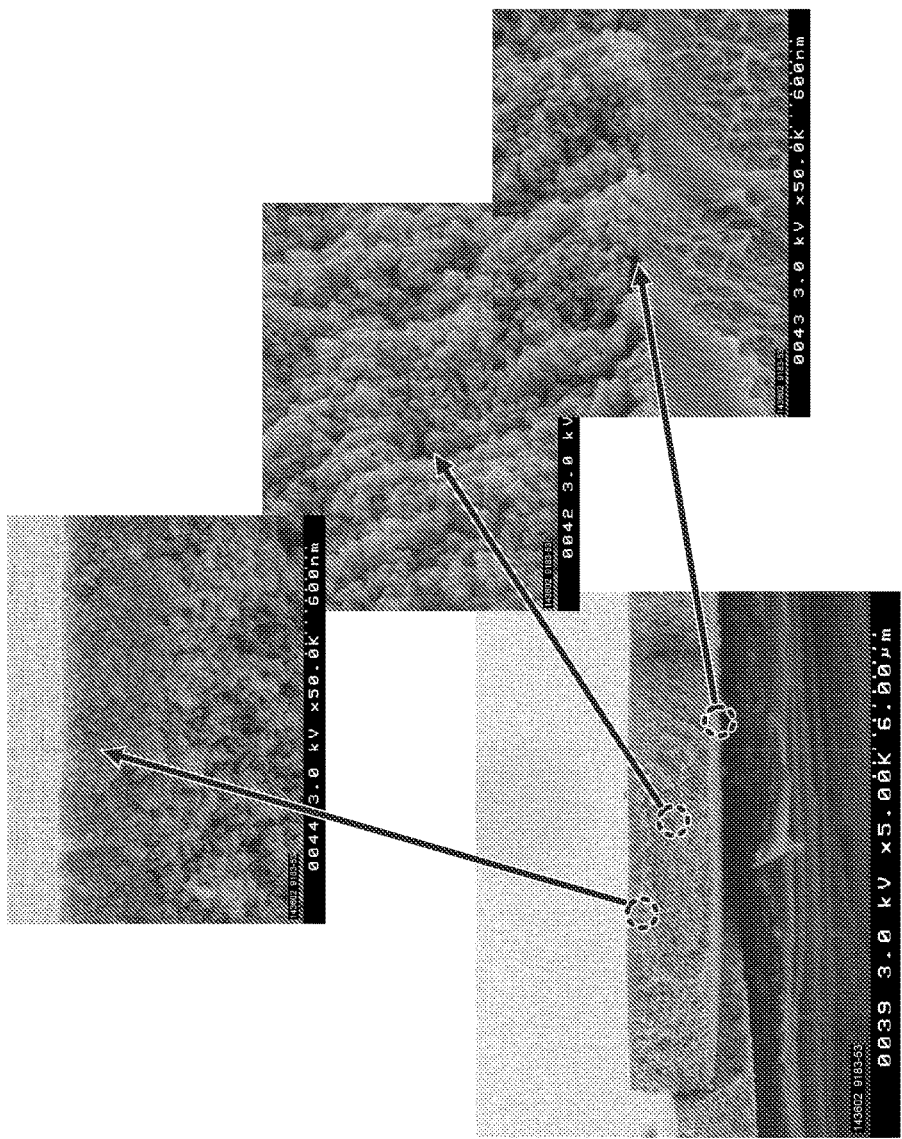
FIGS. 6A-6C are cross-sectional micrographs of gradient optical films.
Figure 6B:
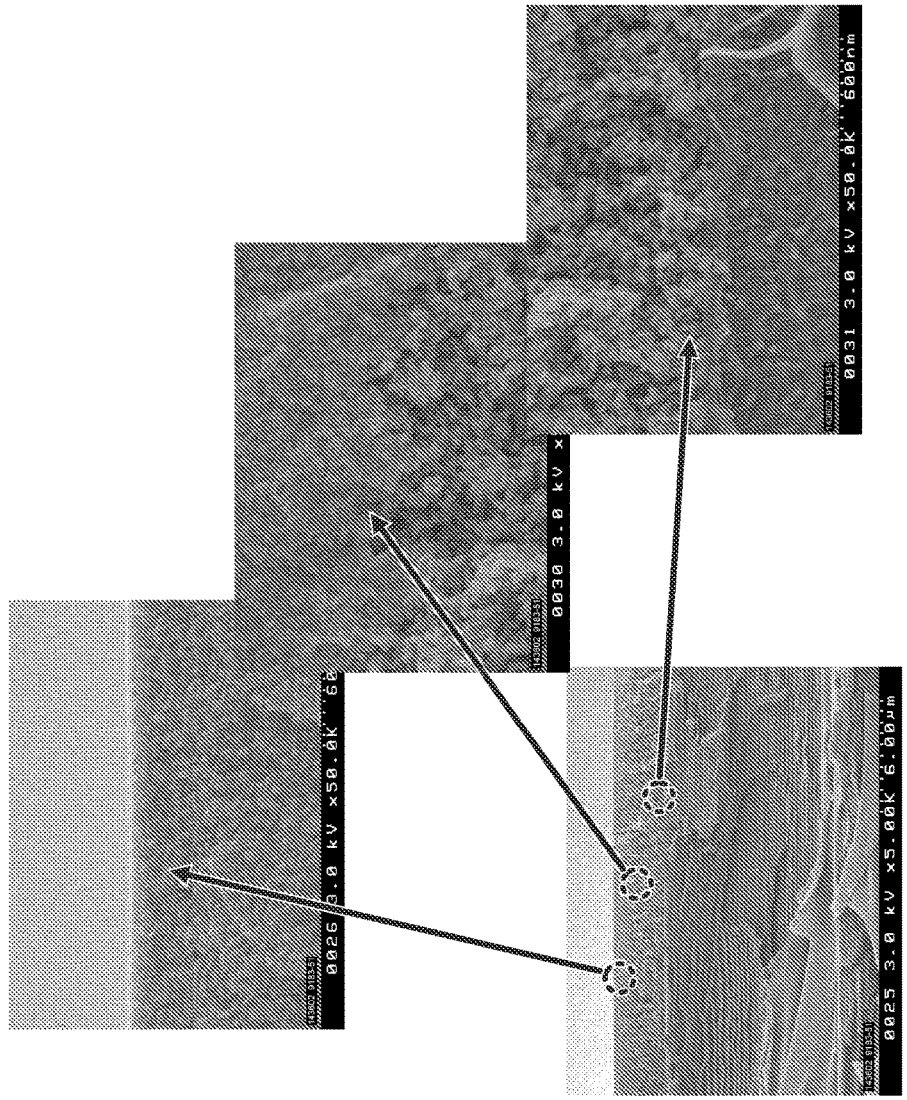
Figure 6C:
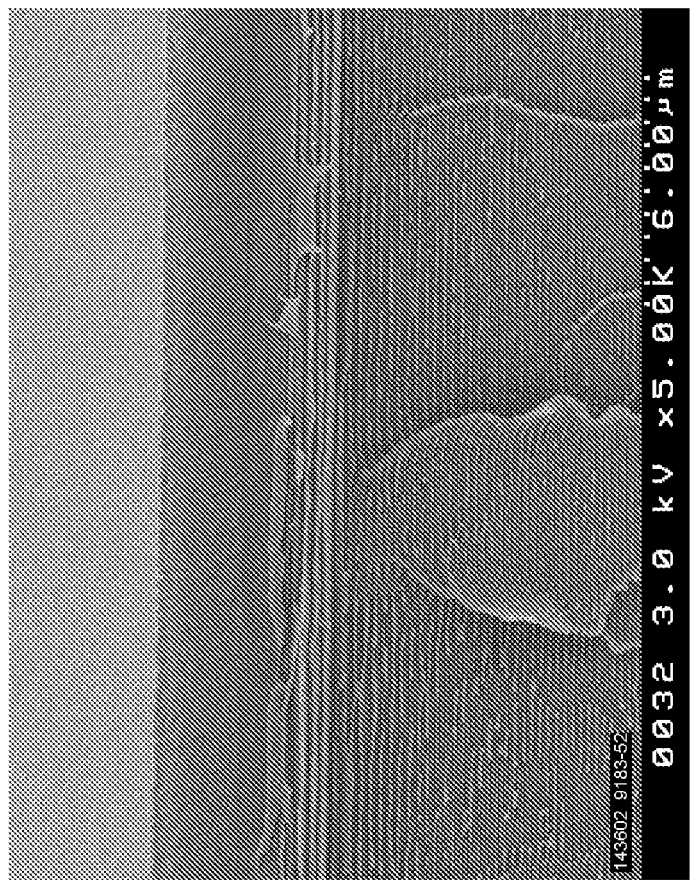

FIGS. 6A-6C show an SEM of samples from Example 1, in order of increasing oxygen level. FIG. 6A shows sample 3a, which was cured at an oxygen level of 1707 ppm. FIG. 6B shows sample 1a, which was cured at 3578 ppm. FIG. 6C shows sample 2a, which was cured at 5640 ppm. The air interface is less porous than the layer near the substrate interface. The thickness of the densified layer is dependent on the oxygen concentration, with higher oxygen levels producing thicker densified layers.

Example 2—Overcoated Control Optical Film without Gradient

A gradient optical film was overcoated with a solution to determine if the solution would infiltrate the pores. Coating solution 'B' was coated onto a gradient optical film, sample 9146-1, which was produced by the processes described in co-pending U.S. Publication No. 2012-0038990. A coating solution was made by mixing Irgacure 819 (0.15 pph) and Irgacure 184 (0.45 pph) into coating solution "A." The solution was coated on a TOPQ reflective polarizer at a line speed of 9.14 m/min. Solution was delivered using a slot-type die at a rate of 43 g/min and at a coating width of 20.3 cm (8 inches). The coating was polymerized using an array of 395 nm UV-LEDs (Cree, Inc., Durham N.C.). The UV-LEDs operated at 2.25 Amps and delivered a UV-V dosage of 0.03 joules per square cm. The array measured 16 LEDs downweb by 22 crossweb. Nitrogen was introduced to the cure chamber using a slot-type manifold to maintain an inert atmosphere. The oxygen concentration in the chamber was measured using a Series 3000 Alpha Omega Analyzer; it was maintained below 100 ppm. After curing, the coating was dried at 150° F. (66 C), then post-cured at 70° F. (21 C) using a Fusion System Model 1600 (Fusion UV Systems, Gaithersburg Md.). The Model 1600 was configured with a D-bulb and operated at 100% power. The UV Fusion chamber was supplied with a flow of nitrogen that resulted in an oxygen concentration of approximately 50 ppm in the post-cure chamber. The subsequent optical film was characterized as described elsewhere, and had a refractive index on the air side of RI=1.23, and a refractive index on the film side of RI=1.23, resulting in a ΔRI=0. Coating solution 'B' was then coated onto the optical film, sample 9146-1, using the process described in Example B. The product of the described process, sample 9146-1 OC, was a two pass coating on a TOP-Q reflective polarizer. A Model 2010

Metricon was used to measure the change in the film side refractive index of the first coating layer before (RI=1.22) and after (RI=1.49) application of the second coating layer. The film side refractive index increased dramatically after coating, indicating that the pores within the optical film were no longer filled with air.

Example 3—Overcoated Gradient Optical Film

A gradient optical film, sample 9211-30, was overcoated with a solution to determine if the solution would infiltrate the pores. Irgacure 819 was added to coating solution A at a loading of 0.06 pph. Coating solution 'A' was then applied to a 2 mil PET film using a 20.3 cm (8 inch) slot-type die at a line speed of 6.1 m/min and a flow rate of 40 g/min. The coating was polymerized using an array of 395 nm UV-LEDs (Cree, Inc., Durham N.C.). The UV-LEDs operated at 5 Amps and delivered a UV-V dosage of 0.1 joules per square cm. The array measured 16 LEDs downweb by 22 LEDs crossweb. Nitrogen was introduced to the cure chamber using a slot-type manifold at a flow rate of 118 L/min. Air was mixed in-line with the nitrogen supply to maintain an oxygen concentration of 5012 ppm in the UV-LED cure chamber. The oxygen concentration in the chamber was measured using a Series 3000 Alpha Omega Analyzer. After curing, the coating was dried at 150° F. (66 C), then post-cured at 70° F. (21 C) using a Fusion System Model 1600 (Fusion UV Systems, Gaithersburg Md.). The Model 1600 was configured with a D-bulb and operated at 100% power. The UV Fusion chamber was supplied with a flow of nitrogen that resulted in an oxygen concentration of approximately 50 ppm in the post-cure chamber. The subsequent gradient optical film, sample 9211-30, was characterized as described elsewhere, and had a refractive index on the air side of RI=1.47, and a refractive index on the film side of RI=1.26, resulting in a ΔRI=0.21.

Coating solution 'B' was then applied to gradient optical film as described in Example B. A Model 2010 Metricon was used to measure the change in the film side refractive index of the first coating layer before (RI=1.26) and after (RI=1.26) application of the second coating layer. Upon application of the second coating, there is negligible change in the film side refractive index, indicating that the first coating is sealed to penetration.

Example 4—Adhesive Penetration into Optical Film

The coated side of optical film sample 9146-1 from Example 2 was laminated to glass using an optically clear pressure sensitive adhesive (8171, available from 3M Company). The sample was thermally aged at 85° C. for a period of 150 h. A Model 2010 Metricon was used to measure the change in the film side refractive index of the coated layer before (RI=1.23) and after (RI=1.33) thermally ageing against the pressure sensitive adhesive layer. The film side refractive index increased after ageing, indicating that some of the pores within the optical film were no longer filled with air.

Example 5—Adhesive Penetration into Gradient Optical Film

The coated side of optical film sample 9211-30 from Example 3 was laminated to glass using an optically clear pressure sensitive adhesive (8171, available from 3M Company). The sample was thermally aged at 85° C. for a period of 150 h. A Model 2010 Metricon was used to measure the change in the film side refractive index of the coated layer before (RI=1.26) and after (RI=1.26) thermally ageing against the pressure sensitive adhesive layer. After thermal ageing there is negligible change in the film side refractive index, indicating that the optical film is sealed to penetration.

Example C—Improved Durability by Monomer Selection

A coating solution "C" was made. First, 360 g of Nalco 2327 colloidal silica particles (40% wt solid and an average particle diameter of about 20 nanometers) and 300 g of 1-methoxy-2-propanol were mixed together under rapid stirring in a 2-liter three-neck flask that was equipped with a condenser and a thermometer. Next, 22.15 g of Silquest A-174 silane was added, and the mixture was stirred for 10 minutes. An additional 400 g of 1-methoxy-2-propanol was then added, and the mixture was heated at 85° C. for 6 hours using a heating mantle. The resulting solution was allowed to cool down to room temperature, and most of water and 1-methoxy-2-propanol solvents (about 700 g) were removed using a rotary evaporator under a 60° C. water-bath. The resulting solution was a clear A-174 modified silica solution having 44% wt A-174 modified 20 nm silica, dispersed in 1-methoxy-2-propanol.

Next 120 g of the A-174 modified silica solution, 17.6 g of CN2302, 35.2 g of SR444, 1.05 g of TEGO Rad 2250, 0.264 g of Irgacure 819, 0.81 g of Irgacure 184, and 156 g of isopropyl alcohol were mixed together by stirring to form a homogenous coating solution C.

Example D—Medium Haze Coating Solution

A coating solution "D" was made. First, 309 g of Nalco 2327 (40% wt solid) and 300 g of 1-methoxy-2-propanol were mixed together under rapid stirring in a 2-liter three-neck flask that was equipped with a condenser and a thermometer. Next, 9.5 g of Silquest A-174 and 19.0 g of Silquest A-1230 were added, and the resulting mixture was stirred for 10 min. The mixture was heated at 80° C. for 1 hour using a heating mantle. An additional 400 g of 1-methoxy-2-propanol was added, and the mixture was kept at 80° C. for 16 hours. The resulting solution was allowed to cool down to room temperature, and most of water and 1-methoxy-2-propanol solvents (about 700 grams) were removed using a rotary evaporator under a 60° C. water-bath. The resulting solution was a clear A174/A1230 modified silica solution having 48.7 wt % A174/A1230 modified 20 nm silica dispersed in 1-methoxy-2-propanol.

Next, 63.4 g of the clear A174/A1230 modified silica solution, 30.8 g of SR 444, 0.46 g of g of Irgacure 184, and 98 g of isopropyl alcohol were mixed together by stirring to form a homogenous coating solution D.

Example E—Coating Solution Having 75 Micron Silica Particles

A coating solution "E" was made. 300 g of Nalco 2329 silica particles (40% wt solid with an average particle size of 75 nm) and 300 g of 1-methoxy-2-propanol were mixed together under rapid stirring in a 1-liter flask that was equipped with a condenser and a thermometer. Next, 7.96 g of Silquest A-174 was added, and the resulting mixture was stirred for 10 min. An additional 400 g of 1-methoxy-2-propanol was added, and the resulting mixture was heated at 85° C. for 6 hours using a heating mantle. The resulting solution was allowed to cool down to room temperature, and most of the water and 1-methoxy-2-propanol solvents (about 720 g) were removed using a rotary evaporator under a 60° C. water-bath. The resulting solution was an A-174 modified 75 nm silica solution having 45 wt % A-174 modified 75 nm silica dispersed in 1-methoxy-2-propanol.

Next, 54.6 g of the A-174 modified 75 nm silica solution, 24.6 g of SR444, 70 g of isopropyl alcohol, 0.122 g of Irgacure 819, and 0.368 g of Irgacure 184 were mixed together by stirring to form a homogenous coating solution E.

Example F—Coating Solution Having Elongated Particles

A coating solution "F" was made. In a 2 liter three-neck flask, equipped with a condenser and a thermometer, 960 grams of IPA-ST-UP organosilica elongated particles, 19.2 grams of deionized water, and 350 grams of 1-methoxy-2-propanol were mixed under rapid stirring. The elongated particles had a diameter in a range from about 9 nm to about 15 nm and a length in a range of about 40 nm to about 100 nm. The particles were dispersed in a 15.2% wt IPA, and 22.8 grams of Silquest A-174 silane was added to the flask. The resulting mixture was stirred for 30 minutes.

The mixture was kept at 81° C. for 16 hours. Next, the solution was allowed to cool down to room temperature, and about 950 grams of the solvent in the solution was removed using a rotary evaporator under a 40° C. water-bath, resulting in a clear A-174-modified elongated silica solution having 41.7% wt A-174-modified elongated silica dispersed in 1-methoxy-2-propanol.

Next, 200 grams of the clear A-174-modified elongated silica solution, 83.4 grams of SR 444, 1.6 g of TEGO Rad 2250, 1.25 grams of Irgacure 184, and 233 grams of isopropyl alcohol were mixed together and stirred, resulting in a homogenous coating solution F, having 32.5% wt solids.

Example G—Coating Procedure

A coating procedure "G" was developed. First, a coating solution was syringe-pumped at a rate of 6 cc/min into a 10.2 cm (4-inch) wide slot-type coating die. The slot coating die uniformly distributed a 10.2 cm wide coating onto a substrate moving at 152 cm/min (10 ft/min).

Next, the coating was polymerized by passing the coated substrate through a UV-LED cure chamber that included a quartz window to allow passage of UV radiation. The UV-LED bank included a rectangular array of 160 UV-LEDs, 8 down-web by 20 cross-web (approximately covering a 10.2 cm×20.4 cm area). The LEDs (available from Cree, Inc., Durham N.C.) operated at a nominal wavelength of 385 nm, and were run at 45 Volts at 8 Amps, resulting in a UV-A dose of 0.212 joules per square cm. The fan cooled UV-LED array was powered by a TENMA 72-6910 (42V/10A) power supply (available from Tenma, Springboro Ohio). The UV-LEDs were positioned above the quartz window of the cure chamber at a distance of approximately 2.5 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber. An additional oxygen flow was supplied to control the total oxygen level in the UV-LED chamber.

After being polymerized by the UV-LEDs, the solvent in the cured coating was removed by transporting the coated substrate to a drying oven at 150° F. (66° C.) for 1 minute at a web speed of 10 ft/min. Next, the dried coating was post-cured using a Fusion System Model 1300P configured with an H-bulb (available from Fusion UV Systems, Gaithersburg Md.). The UV Fusion chamber was supplied with a flow of nitrogen that resulted in an oxygen concentration of approximately 50 ppm in the chamber.

Example 6—Coating on Adhesion Primed PET

Coating solution C was coated on adhesion primed PET films (available from DuPont Teijin Films) according to Example H, with the UV-LEDs at 9 Amps, and variable flow rate and oxygen levels. Optical properties including transmission, haze, clarity, and effective refractive index (RI) were measured as described elsewhere. Results of the measurements on each of the coatings are summarized in Table 2.

TABLE 2

| Sample | Pump Speed (CC/MIN) | N2 (cfh) | Air Flow (cfh) | O2 (ppm) | Trans %. | Haze % | RI (air side) | RI (film side) | ΔRI |
|---|---|---|---|---|---|---|---|---|---|
| 1b | 6 | 100 | 0 | <100 | 88.2 | 14.4 | 1.1716 | 1.1653 | |
| 2b | 6 | 100 | 0.5 | 1000 | 87.9 | 13 | 1.2986 | 1.1892 | 0.109 |
| 3b | 6 | 100 | 1 | 2000 | 87.1 | 14.6 | 1.3386 | 1.1947 | 0.144 |
| 4b | 6 | 100 | 2 | 4000 | 87.5 | 17.7 | 1.4371 | 1.2102 | 0.227 |
| 5b | 6 | 50 | 2 | 6000 | 89.2 | 23.9 | 1.4717 | 1.2705 | 0.201 |
| 9b | 5 | 100 | 2 | 4000 | 89.5 | 16 | 1.4623 | 1.2351 | 0.227 |
| 10b | 7 | 100 | 2 | 4000 | 86.1 | 25.3 | 1.4351 | 1.2058 | 0.229 |
| 11b | 8 | 100 | 2 | 4000 | 85.5 | 26.9 | 1.3829 | 1.1961 | 0.187 |

Figure 7A:
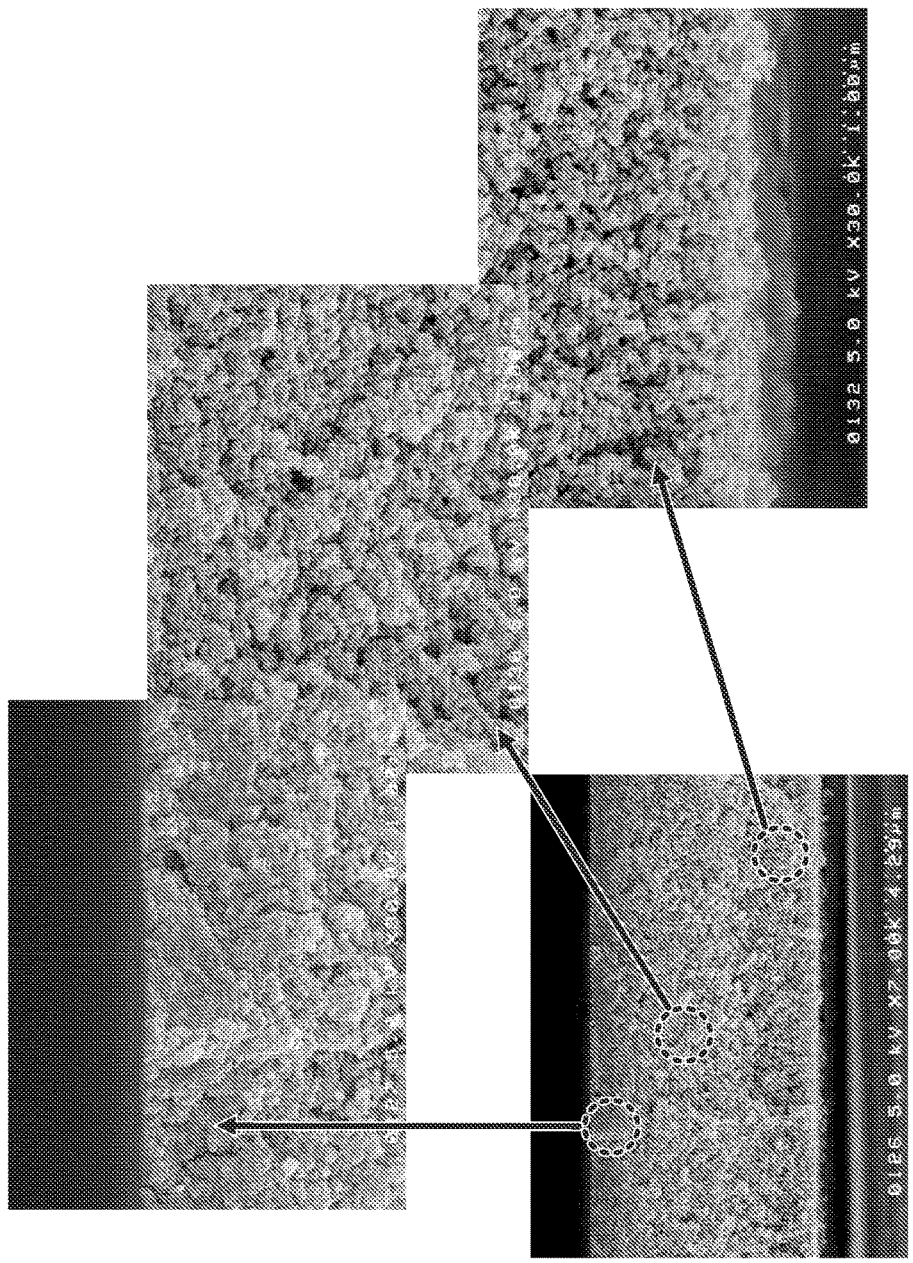
FIGS. 7A-7C are cross-sectional micrographs of gradient optical films.

Scanning Electron Micrographs (SEMs) of the gradient optical film were obtained. First, a representative sample of the gradient optical film was selected. Next, the sample was frozen in liquid nitrogen. Then, the sample was fractured immediately after it was removed from the liquid nitrogen to expose a cross-section of the gradient optical film along the thickness direction. Next, the sample was sputtered with an approximately 1 nm thick layer of a gold/palladium alloy to reduce electrical charging of the sample in subsequent processing. The top surface and the cross-section of the gradient optical film were then imaged using a scanning electron microscope. FIG. 7A shows an SEM of sample 10b from Example 6; sample 10b had the largest ΔRI of the samples prepared in Example 6. Larger ΔRI corresponded to a larger difference in the void volume fraction in the two surfaces.

Example 7—Photoinitiator Primed PET Substrate with Medium Haze Gradient Coating

A photoinitiator (PI) coating solution was prepared by mixing 0.2% by weight of Irgacure 819 with MEK. This PI coating solution was coated onto 2 mil (0.05 mm) PET film, using a pressure pot at 1.75 cc/min through an 8" wide slot die that was shimmed to 4", at a speed of 30 feet/min (75.6 cm/min). The coating was dried in an oven at 150° F. (66° C.), resulting in a PI primed 2 mil (0.05 mm) PET film.

Coating solution D was coated on the PI primed 2 mil (0.05 mm) PET films according to Example H, except the UV-LEDs (available from Cree, Inc., Durham N.C.) operated at a nominal wavelength of 395 nm, and were run at 13 Amps. Optical properties including transmission, haze, clarity, and effective refractive index (RI) were measured as described elsewhere. Results of the measurements on each of the coatings are summarized in Table 3.

TABLE 3

| Sample | N2 (cfh) | Air (cfh) | O2 (ppm) | Trans % | Haze % | Clarity % | RI (air side) | RI film side | ΔRI |
|---|---|---|---|---|---|---|---|---|---|
| 27c | 100 | 0 | <100 | 68 | 59 | 99.5 | 1.1523 | 1.1616 | |
| 28c | 100 | 0.5 | 1000 | 67.7 | 65.5 | 97.3 | 1.286 | 1.1708 | 0.115 |
| 29c | 100 | 1 | 2000 | 68.4 | 63.2 | 75.1 | 1.3717 | 1.1746 | 0.197 |
| 30c | 100 | 2 | 4000 | 67.9 | 68.6 | 84.1 | 1.459 | 1.1924 | 0.267 |
| 31c | 50 | 2 | 6000 | 65.7 | 79.9 | 71.5 | 1.4691 | 1.2158 | 0.253 |

Figure 7B:
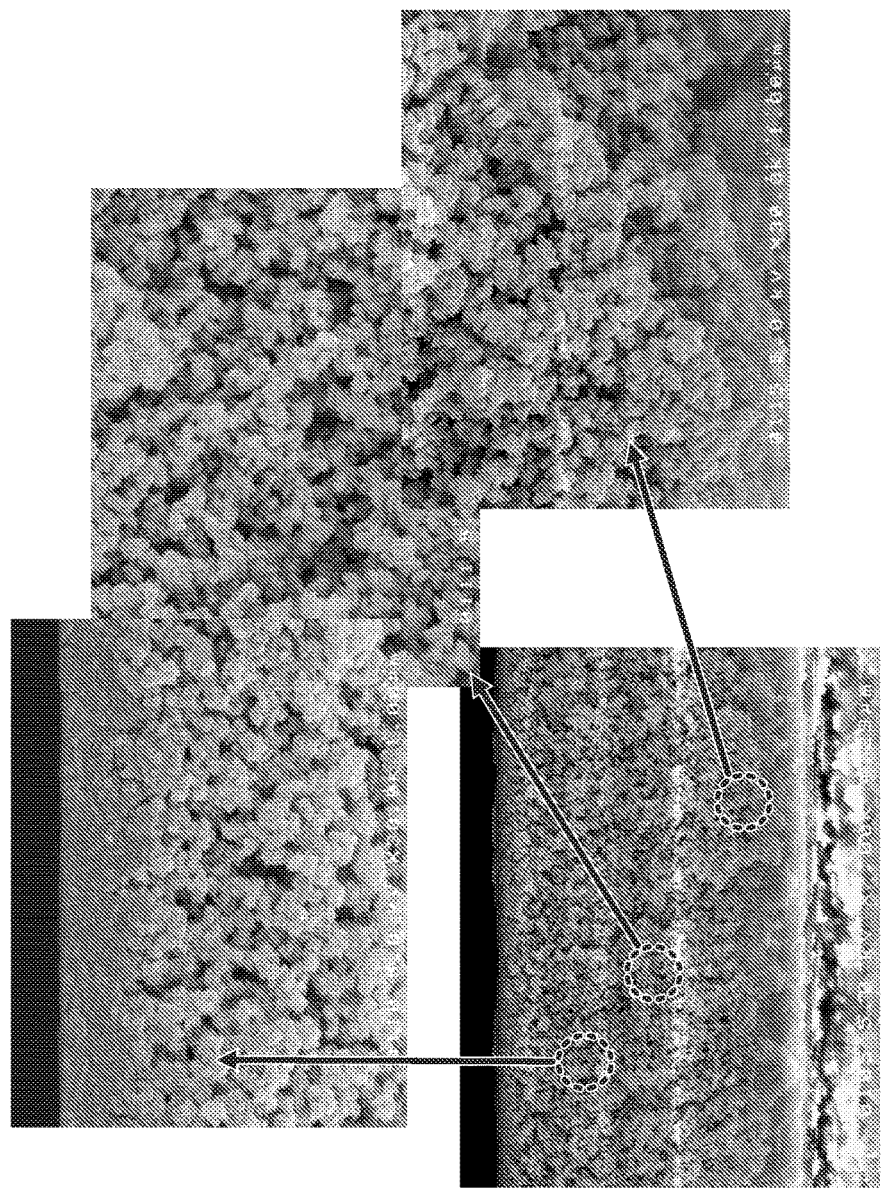

Scanning Electron Micrographs (SEMs) of the gradient optical film were obtained. First, a representative sample of the gradient optical film was selected. Next, the sample was frozen in liquid nitrogen. Then, the sample was fractured immediately after it was removed from the liquid nitrogen to expose a cross-section of the gradient optical film along the thickness direction. Next, the sample was sputtered with an approximately 1 nm thick layer of a gold/palladium alloy to reduce electrical charging of the sample in subsequent processing. The top surface and the cross-section of the gradient optical film were then imaged using a scanning electron microscope. FIG. 7B shows an SEM of sample 30c from Example 7; sample 30c had the largest ΔRI of the samples prepared in Example 7. Larger ΔRI corresponded to a larger difference in the void volume fraction in the two surfaces.

Example 8—PI Primed PET Substrate with 75 Micron Silica Coating Solution

Coating solution E was coated on PI primed 2 mil (0.05 mm) PET films according to Example H, with a 5 cc/min solution flow rate, varied oxygen levels, and the UV-LEDs were run at 9 Amps. Optical properties including transmission, haze, and effective refractive index (RI) were measured as described elsewhere. Results of the measurements on each of the coatings are summarized in Table 4.

TABLE 4

| Sample | N2 (cfh) | Air (cfh) | O2 (ppm) | Trans % | Haze % | Clarity % | RI (air side) | RI (film side) | ΔRI |
|---|---|---|---|---|---|---|---|---|---|
| 13d | 100 | 0 | <100 | 53.2 | 92.2 | 98.8 | 1.1632 | 1.1532 | |
| 14d | 100 | 0.5 | 1000 | 53.4 | 92.8 | 98.9 | 1.2166 | 1.1743 | 0.043 |
| 15d | 100 | 1 | 2000 | 53.1 | 93 | 98.9 | 1.2428 | 1.1909 | 0.052 |
| 16d | 100 | 2 | 4000 | 55.3 | 93.7 | 98.6 | 1.3003 | 1.2145 | 0.086 |
| 17d | 50 | 2 | 6000 | 59.9 | 93.7 | 98.6 | 1.439 | 1.238 | 0.201 |

Figure 7C:
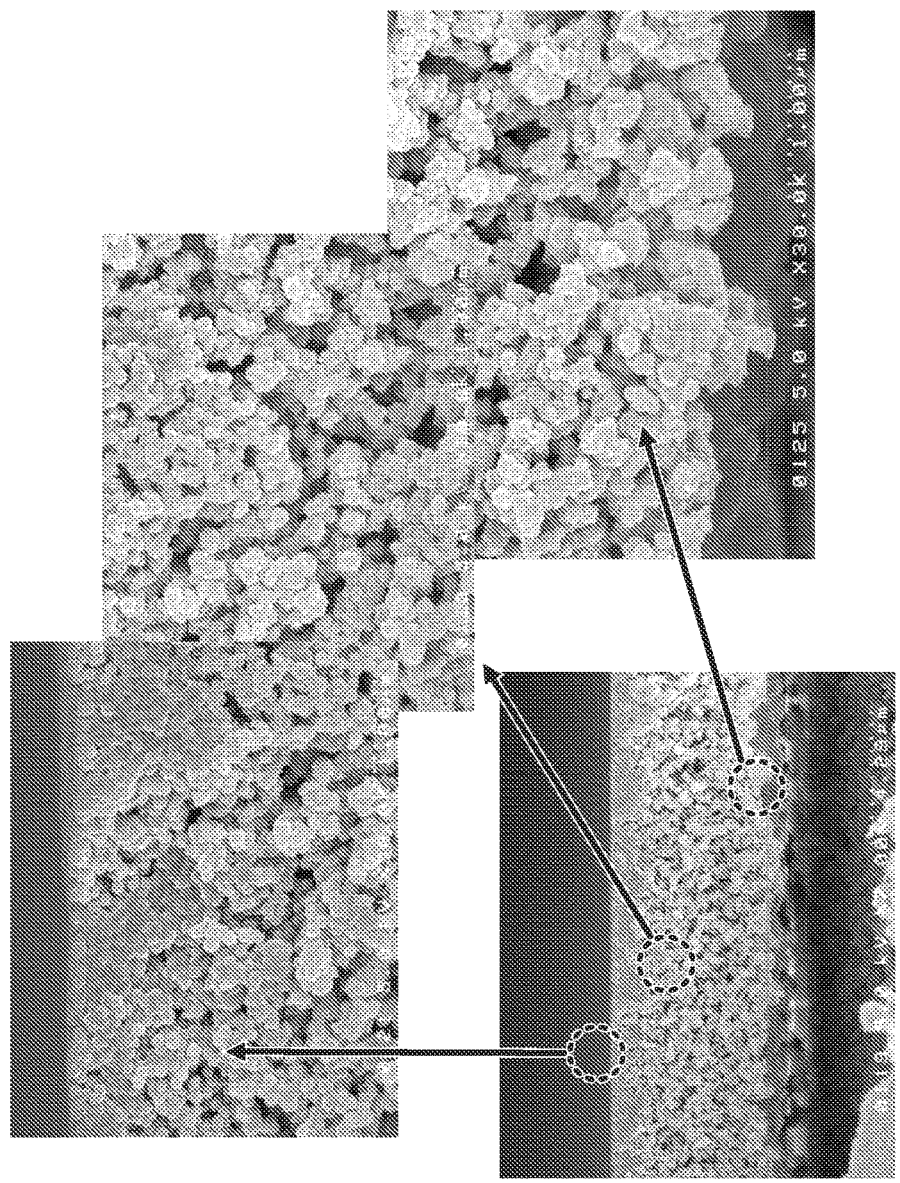

Scanning Electron Micrographs (SEMs) of the gradient optical film were obtained. First, a representative sample of the gradient optical film was selected. Next, the sample was frozen in liquid nitrogen. Then, the sample was fractured immediately after it was removed from the liquid nitrogen to expose a cross-section of the gradient optical film along the thickness direction. Next, the sample was sputtered with an approximately 1 nm thick layer of a gold/palladium alloy to reduce electrical charging of the sample in subsequent processing. The top surface and the cross-section of the gradient optical film were then imaged using a scanning electron microscope. FIG. 7C shows an SEM of sample 17d from Example 8; sample 17d had the largest ΔRI of the samples prepared in Example 8. Larger ΔRI corresponded to a larger difference in the void volume fraction in the two surfaces.

Example 9—PI Primed PET Substrate with Elongated Particle Coating Solution

Coating solution F was coated on the PI primed 2 mil (0.05 mm) PET films according to Example H, with 5 cc/min solution flow rate, the UV-LED (available from Cree, Inc., Durham N.C.) operated at a nominal wavelength of 395 nm, and was run at 13 Amps. Optical properties including transmission, haze, clarity, and refractive index (RI) were measured as described elsewhere. Results of the measurements on each of the coatings are summarized in Table 5.

TABLE 5

| Sample | Air (cfh) | O2 (ppm) | Trans % | Haze (%) | RI (air side) | RI (film side) | ΔRI |
|---|---|---|---|---|---|---|---|
| 19 | 0 | <300 | 92.7 | 1.33 | 1.1555 | 1.16 | |
| 21 | 0.5 | 1000 | 92.6 | 1.89 | 1.2258 | 1.1871 | 0.0387 |
| 23 | 1 | 2000 | 92.4 | 1.16 | 1.2525 | 1.2009 | 0.0516 |
| 25 | 2 | 4000 | 91.5 | 2.54 | 1.315 | 1.2261 | 0.0889 |
| 27 | 2 | 6500 | 91.4 | 2.62 | 1.3251 | 1.2248 | 0.1003 |

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A process comprising:
    applying a coating comprising a first solution comprising a polymerizable material in a solvent onto a substrate;
    exposing a first region of the coating to a first curing environment and a second region of the coating to a different second curing environment to at least partially polymerize the polymerizable material to form an insoluble polymer matrix bicontinuous with a plurality of nanovoids and a second solution, the second solution occupying the plurality of nanovoids, wherein the second solution comprises the solvent, wherein an average diameter of each nanovoid of the plurality of nanovoids is between about 1 nm to about 1000 nm, wherein a first volume fraction of the plurality of nanovoids proximate the first region of the coating is less than a second volume fraction of the plurality of nanovoids proximate the adjacent region of the coating; and
    removing a major portion of the solvent from the second solution.

2. The process of claim 1, wherein the first curing environment comprises a polymerization inhibitor.

3. The process of claim 1, wherein an oxygen concentration proximate the first region is greater than the oxygen concentration proximate the second region.

4. The process of claim 1, further comprising an actinic radiation absorbing material in the first solution.

5. The process of claim 1, wherein removing a major portion of the solvent comprises drying in a thermal oven, drying with infrared or other radiant light sources, vacuum drying, gap drying, or a combination thereof.

* * * * *

UNITED STATES PATENT AND TRADEMARK OFFICE
CERTIFICATE OF CORRECTION

PATENT NO. : 10,293,370 B2
APPLICATION NO. : 13/501304
DATED : May 21, 2019
INVENTOR(S) : Adam Haag et al.

Page 1 of 1

It is certified that error appears in the above-identified patent and that said Letters Patent is hereby corrected as shown below:

In the Specification

Column 5
Line 1, Delete "2012-003890;" and insert -- 2012-0038990; --, therefor.

Column 7
Line 42, Delete "absorbtivity," and insert -- absorptivity, --, therefor.
Line 48, Delete "absorbtivity," and insert -- absorptivity, --, therefor.
Line 51, Delete "absorbtivities" and insert -- absorptivities --, therefor.

Column 8
Line 48-49, Delete "hydrophyilic" and insert -- hydrophilic --, therefor.
Line 50-51, Delete "hydrophyllic" and insert -- hydrophilic --, therefor.

Column 13
Line 1, Delete "DAROCURE™" and insert -- DAROCUR™ --, therefor.
Line 63, Delete "crosslinking" and insert -- crosslinking. --, therefor.

Column 18
Line 60, Delete "insolumble" and insert -- insoluble --, therefor.

Column 19
Line 7, Delete "coating" and insert -- coating. --, therefor.

Column 28
Line 41-42, Delete "1-mothoxy-2-propanol" and insert -- 1-methoxy-2-propanol --, therefor.

Signed and Sealed this
Nineteenth Day of May, 2020

Andrei Iancu
*Director of the United States Patent and Trademark Office*